US008294812B2

(12) United States Patent
Okada et al.

(10) Patent No.: US 8,294,812 B2
(45) Date of Patent: Oct. 23, 2012

(54) IMAGE-SHOOTING APPARATUS CAPABLE OF PERFORMING SUPER-RESOLUTION PROCESSING

(75) Inventors: Seiji Okada, Osaka (JP); Akihiro Maenaka, Osaka (JP); Mitsuaki Kurokawa, Osaka (JP); Satoru Takeuchi, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 460 days.

(21) Appl. No.: 12/537,518

(22) Filed: Aug. 7, 2009

(65) Prior Publication Data

US 2010/0033602 A1 Feb. 11, 2010

(30) Foreign Application Priority Data

Aug. 8, 2008 (JP) ................................. 2008-206054
Jun. 24, 2009 (JP) ................................. 2009-149389

(51) Int. Cl.
*H04N 5/235* (2006.01)
(52) U.S. Cl. .................................... 348/362; 348/222.1
(58) Field of Classification Search ................ 348/208.6
See application file for complete search history.

(56) References Cited

U.S. PATENT DOCUMENTS

| 2002/0071048 A1* | 6/2002 | Kaneda .......................... 348/363 |
| 2002/0122133 A1* | 9/2002 | Ejima ............................ 348/362 |
| 2002/0180876 A1* | 12/2002 | Sobol ............................ 348/296 |
| 2005/0019000 A1* | 1/2005 | Lim et al. ........................ 386/46 |
| 2007/0077055 A1* | 4/2007 | Tominaga et al. ............. 396/256 |
| 2007/0146503 A1* | 6/2007 | Shiraki ....................... 348/231.3 |

(Continued)

FOREIGN PATENT DOCUMENTS

JP 9261526 10/1997

(Continued)

OTHER PUBLICATIONS

"Super-Resolution Image Reconstruction: A Technical Overview," Sung Cheol Park, Min Kyu Park, and Moon Gi Kang; Ieee Signal Processing Magazine, pg. 21-36; May 2003.

*Primary Examiner* — Jason Chan
*Assistant Examiner* — Abdelaaziz Tissire
(74) *Attorney, Agent, or Firm* — NDQ&M Watchstone LLP

(57) ABSTRACT

A super-resolution processing portion has a high-resolution image generation portion that fuses a plurality of first input images together to generate a high-resolution image. The first input images are shot at a shutter speed equal to or faster than the super-resolution limit shutter speed, which is the lower-limit shutter speed that enables super-resolution processing to make the resolution of the output image equal to or higher than that of the input images. According to the amount of exposure, one of the following different methods for super-resolution processing is selected: a first method that yields as the output image the high-resolution image; a second method that yields as the output image a weighted added image resulting from weighted addition of the high-resolution image and an image based on an averaged image; and a third method that yields as the output image a weighted added image resulting from weighted addition of the high-resolution image and an image based on a second input image.

5 Claims, 15 Drawing Sheets

U.S. PATENT DOCUMENTS

| | | | |
|---|---|---|---|
| 2007/0230932 A1* | 10/2007 | Tanaka et al. | 396/55 |
| 2008/0055683 A1* | 3/2008 | Choe et al. | 358/525 |
| 2008/0056613 A1 | 3/2008 | Hatanaka et al. | |
| 2008/0107356 A1* | 5/2008 | Matsumoto et al. | 382/299 |
| 2008/0267608 A1* | 10/2008 | Kubota | 396/374 |
| 2009/0002504 A1* | 1/2009 | Yano et al. | 348/218.1 |
| 2009/0033792 A1* | 2/2009 | Kano et al. | 348/441 |
| 2009/0084939 A1* | 4/2009 | Sambongi | 250/208.1 |
| 2009/0167928 A1* | 7/2009 | Asukabe et al. | 348/345 |
| 2009/0179995 A1* | 7/2009 | Fukumoto et al. | 348/208.6 |
| 2009/0284610 A1* | 11/2009 | Fukumoto et al. | 348/208.99 |
| 2010/0002949 A1* | 1/2010 | Tanaka et al. | 382/254 |

FOREIGN PATENT DOCUMENTS

| | | | |
|---|---|---|---|
| JP | 2001-197357 | * | 7/2001 |
| JP | 2008060927 | | 3/2008 |
| JP | 2008092416 | | 4/2008 |
| WO | WO 2007102377 A1 | * | 9/2007 |

* cited by examiner

Fig.16
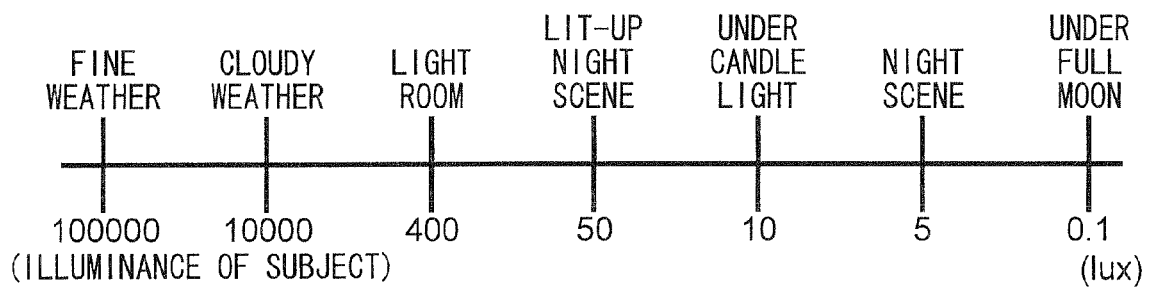
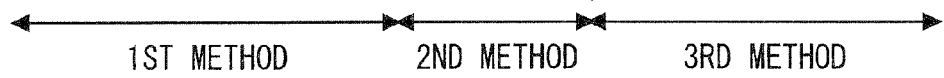

IMAGE-SHOOTING APPARATUS CAPABLE OF PERFORMING SUPER-RESOLUTION PROCESSING

This application is based on Japanese Patent Application No. 2008-206054 filed on Aug. 8, 2008 and Japanese Patent Application No. 2009-149389 filed on Jun. 24, 2009, the contents of both of which are hereby incorporated by reference.

BACKGROUND OF THE INVENTION

1. Field of the Invention

The present invention relates to an image-shooting apparatus capable of performing super-resolution processing to obtain a high-resolution image based on a low-resolution image obtained by shooting.

2. Description of Related Art

In recent years, there have been proposed various image-shooting apparatuses capable of so-called super-resolution processing, whereby a high-resolution image is obtained by use of a low-resolution image obtained by shooting. One example of such super-resolution processing is a method whereby one high-resolution image is generated by use of a plurality of low-resolution images.

In such a method whereby a high-resolution image is generated by use of a plurality of low-resolution images, the challenge is to reduce degradation in the individual low-resolution images. In particular, extreme degradation in low-resolution images is problematic because it prevents super-resolution processing from achieving its effect of increasing resolution. Specifically, if folding noise (aliasing—noise occurring in an image generated by capturing an optical image having a high spatial frequency equal to or higher than one-half (the Nyquist frequency) of the reciprocal 1/t of the pixel pitch t of an image sensor) is unlikely to occur in low-resolution images, it will be difficult to obtain the effect of enhancing resolution through cancellation of folding noise.

Cases where noise is unlikely to occur in low-resolution images include, for example, those where camera shake, subject motion, or the like occurring during shooting degrades images. In such cases, blurring of an image makes high-frequency components extremely small, and this makes folding noise unlikely to occur. Situations where camera shake, subject motion, or the like is likely to occur during shooting include, for example, those where the light entering an image-shooting apparatus is weak. In such cases, the shutter speed needs to be slow (the exposure time needs to be long), and this makes camera shake, subject motion, or the like likely.

Increasing the shutter speed may reduce camera shake, subject motion, or the like. Doing so, however, requires that the sensitivity of an image sensor be increased, and this causes a low-resolution image to contain noise. As a result, when a high-resolution image is generated, the noise in a low-resolution image is amplified, and this makes it difficult to obtain a satisfactory high-resolution image.

SUMMARY OF THE INVENTION

According to one aspect of the invention, an image-shooting apparatus is provided with: an image-shooting portion that generates an input image by shooting; a super-resolution processing portion that performs super-resolution processing on a plurality of input images obtained from the image-shooting portion to generate an output image having a resolution equal to or higher than the resolution of the input images. Here, the shutter speed at which the image-shooting portion shoots at least one of the input images is made equal to or faster than the super-resolution limit shutter speed, which is the lower-limit shutter speed that enables the super-resolution processing to make the resolution of the output image equal to or higher than the resolution of the input images.

According to another aspect of the invention, an image-shooting apparatus is provided with: an image-shooting portion that generates an input image by shooting; and a super-resolution processing portion that performs super-resolution processing on a plurality of input images obtained from the image-shooting portion to generate an output image having a resolution equal to or higher than the resolution of the input images. Here, when the amount of exposure in the image-shooting portion is equal to or more than a second threshold value, the shutter speed at which the image-shooting portion shoots at least one of the input images is made equal to or faster than the super-resolution limit shutter speed, which is the lower-limit shutter speed that enables the super-resolution processing to make the resolution of the output image equal to or higher than the resolution of the input images, and, when the amount of exposure in the image-shooting portion is less than the second threshold value, the shutter speed at which the image-shooting portion shoots the input images is made less than the super-resolution limit shutter speed.

BRIEF DESCRIPTION OF THE DRAWINGS

FIG. 16 is a diagram showing an example of the relationship between the shooting situation and the method for super-resolution processing used;

DETAILED DESCRIPTION OF PREFERRED EMBODIMENTS

An image-shooting apparatus embodying the present invention will be described below with reference to the accompanying drawings. Taken up as an example of an image-shooting apparatus will be one, such as a digital camera, capable of recording sounds, moving images (movies), and still images (still pictures).

Image-Shooting Apparatus

Figure 1:
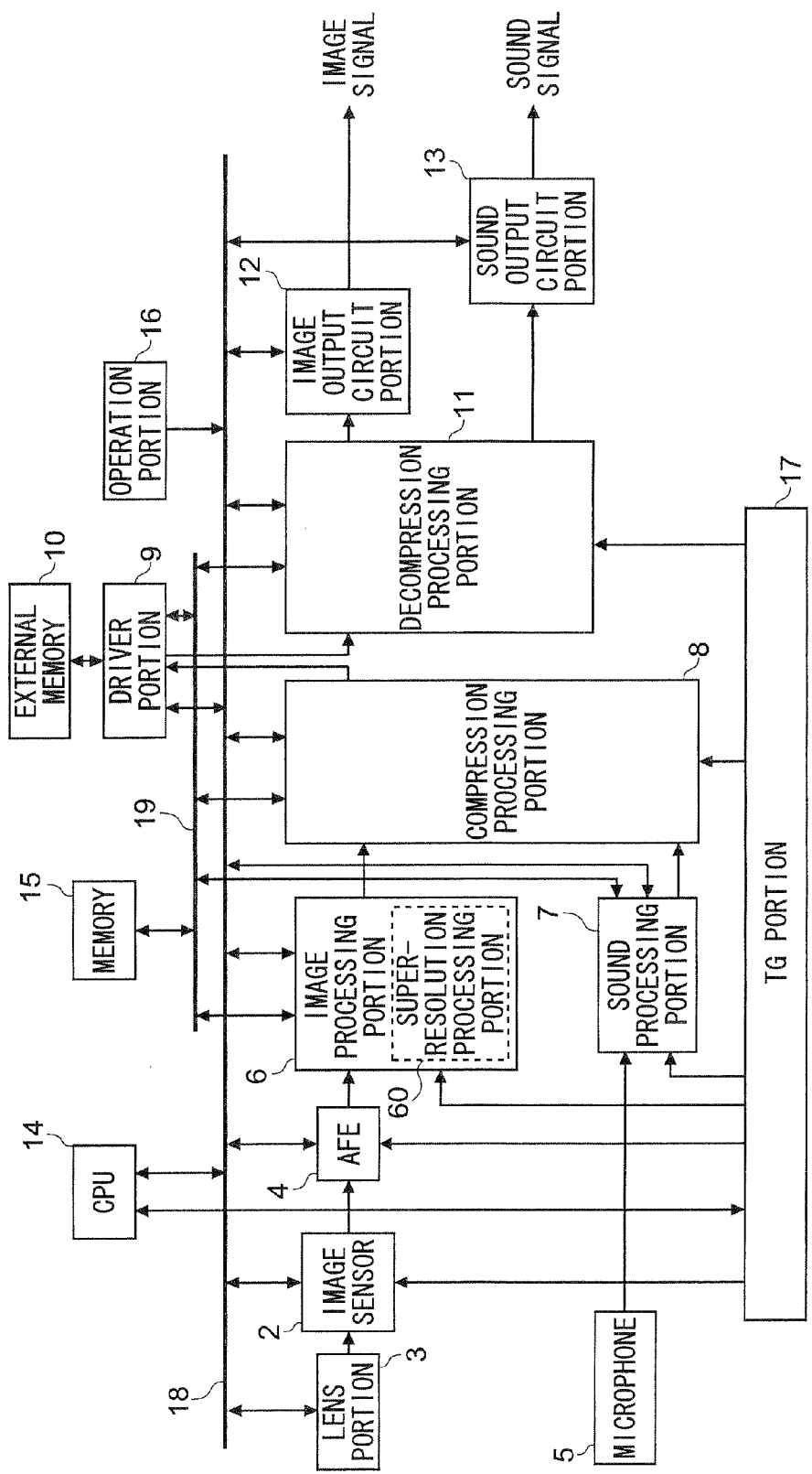
FIG. 1 is a block diagram showing the configuration of an image-shooting apparatus embodying the invention.

First, a configuration of an image-shooting apparatus will be described with reference to FIG. 1. FIG. 1 is a block diagram showing the configuration of an image-shooting apparatus embodying the invention.

As shown in FIG. 1, the image-shooting apparatus 1 is provided with: an image sensor 2 built with a solid-state image-sensing device, such as a CCD (charge-coupled device) or CMOS (complementary metal oxide semiconductor) sensor, that converts an incident optical image into an electrical signal; and a lens portion 3 that focuses an optical image of a subject on the image sensor 2 and that adjusts the amount of light etc. Together the lens portion 3 and the image sensor 2 form an image-shooting portion, which generates an image signal. The lens portion 3 is provided with various lenses (unillustrated), such as a zoom lens and a focus lens, and an aperture stop (unillustrated) for adjusting the amount of light falling on the image sensor 2.

The image-shooting apparatus 1 is further provided with: an AFE (analog front end) 4 that converts the image signal—an analog signal—output from the image sensor 2 into a digital signal and that adjusts gain; a microphone 5 that converts the sounds it collects into an electrical signal; an image processing portion 6 that converts the image signal—R (red), G (green), and B (blue) digital signals—output from the AFE 4 into a signal in terms of a Y (brightness) signal and U and V (color difference) signals and that applies various kinds of image processing to the image signal; a sound processing portion 7 that converts the sound signal—an analog signal—output from the microphone 5 into a digital signal; a compression processing portion 8 that applies compression-encoding processing for still images, as by a JPEG (Joint Photographic Experts Group) compression method, to the image signal output from the image processing portion 6 or that applies compression-encoding processing for moving images, as by an MPEG (Moving Picture Experts Group) compression method, to the image signal output from the image processing portion 6 and the sound signal output from the sound processing portion 7; an external memory 10 to which is recorded the compressed-encoded signal compressed-encoded by the compression processing portion 8; a driver portion 9 that records and reads an image signal to and from the external memory 10; and a decompression processing portion 11 that decompresses and decodes a compressed-encoded signal read from the external memory 10. The image processing portion 6 is provided with a super-resolution processing portion 60 that applies super-resolution processing to the image signal fed to it.

The image-shooting apparatus 1 is further provided with: an image output circuit portion 12 that converts the image signal decoded by the decompression processing portion 11 into a signal in a format displayable on a display device (unillustrated) such as a display; and a sound output circuit portion 13 that converts the sound signal decoded by the decompression processing portion 11 into a signal reproducible on a reproducing device such as a speaker.

The image-shooting apparatus 1 is further provided with: a CPU (central processing unit) 14 that controls the overall operation within the image-shooting apparatus 1; a memory 15 that stores programs for performing of various kinds of processing and that temporarily stores signals during execution of programs; an operation portion 16 on which a user enters commands by use of buttons and the like such as those for starting shooting and for confirming various settings; a timing generator (TG) portion 17 that outputs a timing control signal for synchronizing the operation of different parts; a bus 18 across which signals are exchanged between the CPU 14 and different parts; and a bus 19 across which signals are exchanged between the memory 15 and different parts.

The external memory 10 may be of any type so long as image signals and sound signals can be recorded to it. Usable as the external memory 10 is, for example, a semiconductor memory such as an SD (secure digital) card, an optical disc such as a DVD, or a magnetic disk such as a hard disk. The external memory 10 may be removable from the image-shooting apparatus 1.

Next, the basic operation of the image-shooting apparatus 1 will be described. First, the image-shooting apparatus 1 acquires an image signal in the form of an electrical signal, by photoelectrically converting the light incoming through the image-shooting apparatus 1 with the image sensor 2. Then, in synchronism with the timing control signal fed from the TG portion 17, at a predetermined frame period (e.g., 1/60 seconds), the image sensor 2 sequentially outputs the image signal to the AFE 4. The mage signal is converted from an analog signal to a digital signal by the AFE 4, and is then fed to the image processing portion 6. The image processing portion 6 converts the image signal into a signal in terms of digital signals YUV, and applies to it various kinds of image processing such as gradation correction and edge enhancement. The memory 15 acts as a frame memory, temporarily holding the image signal during the operation of the image processing portion 6.

Based on the image signal fed to the image processing portion 6 at this time, the lens portion 3 adjusts the position of different lenses for adjustment of focus, and also adjusts the aperture of the aperture stop for adjustment of exposure. The adjustment of focus and exposure here is done automatically according to a predetermined program to obtain an optimal focus and an optimal exposure respectively, or is done manually according to commands from the user. As necessary, the super-resolution processing portion 60 provided in the image processing portion 6 applies super-resolution processing to the image signal fed to it.

When a moving image is recorded, an image signal along with a sound signal is recorded. The sound signal output from the microphone 5—sounds as converted into an electrical signal by the microphone 5—is fed to the sound processing portion 7, which then digitizes it and applies to it processing such as noise elimination. The image signal output from the image processing portion 6 and the sound signal output from the sound processing portion 7 are together fed to the compression processing portion 8, which then compresses them by a predetermined compression method. Here, the image signal and the sound signal are temporally associated with each other so that, at the time of playback, the image keeps pace with the sounds. The compressed image and sound signals are, via the driver portion 9, recorded to the external memory 10.

On the other hand, when a still image or sounds alone are recorded, either an image signal or sound signal is compressed by a predetermined compression method in the compression processing portion 8, and is then recorded to the external memory 10. The processing performed in the image processing portion 6 may be varied between when a moving image is recorded and when a still image is recorded.

On a command from the user, the compressed image and sound signals recorded to the external memory 10 are read by the decompression processing portion 11. The decompression processing portion 11 decompresses the compressed image and sound signals, and then outputs the image signal to the image output circuit portion 12 and the sound signal to the sound output circuit portion 13. The image output circuit portion 12 and the sound output circuit portion 13 convert them into signals in formats displayable and reproducible on the display device and on the speaker respectively, and outputs these signals.

The display device and the speaker may be provided integrally with the image-shooting apparatus 1, or may be provided separately so as to be connected by cables or the like to terminals provided in the image-shooting apparatus 1.

At the time of so-called previewing, which enables the user simply to view the image (through image) displayed on the display device or the like without recording an image signal, the image signal output from the image processing portion 6 may be output, uncompressed, to the image output circuit portion 12. When the image signal of a moving image is recorded, at the same time that it is compressed by the compression processing portion 8 and recorded to the external memory 10, it may also be output via the image output circuit portion 12 to the display device or the like.

Super-Resolution Processing

Figure 2:
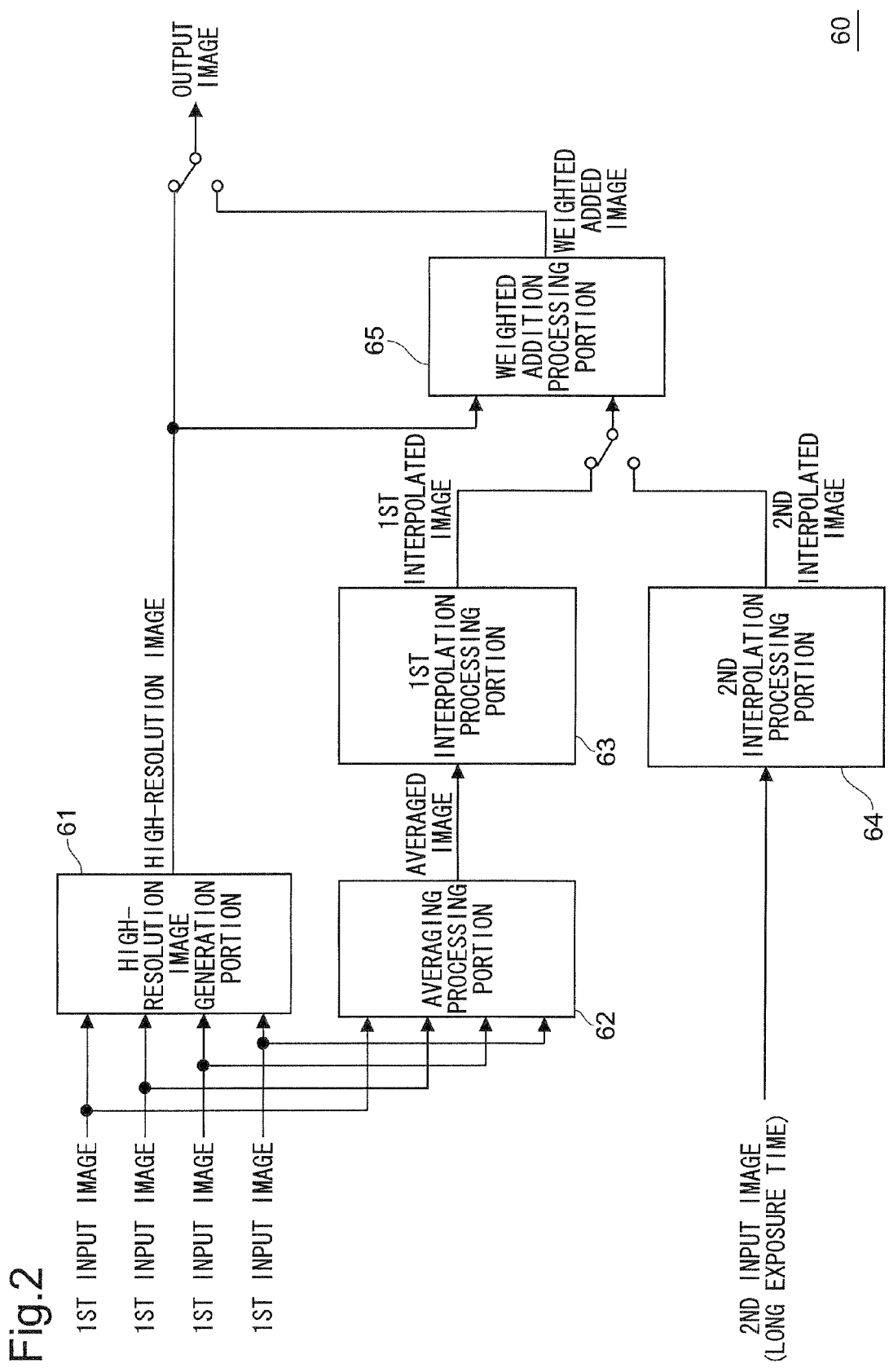
FIG. 2 is a block diagram showing the configuration of a super-resolution processing portion in an image-shooting apparatus embodying the invention.

The configuration of the super-resolution processing portion will now be described with reference to FIG. 2. FIG. 2 is a block diagram showing a basic configuration of the super-resolution processing portion in an image-shooting apparatus embodying the invention. For the sake of concrete description, in the following description, the image signal fed to the super-resolution processing portion 60 to be subjected to super-resolution processing is handled as images, called "input images." Likewise, the image signal output from the super-resolution processing portion 60 is handled as an image, called an "output image." The following description deals with a case where super-resolution processing is performed on still images.

As shown in FIG. 2, the super-resolution processing portion 60 is provided with: a high-resolution image generation portion 61 that receives a plurality of first input images and that fuses those received input images together to generate a high-resolution image; an averaging processing portion 62 that receives the plurality of first input images and that applies averaging processing to those received first input images to generate an averaged image; a first interpolation processing portion 63 that applies interpolation processing to the averaged image output from the averaging processing portion 62 to generate a first interpolated image; a second interpolation processing portion 64 that receives a second input image and that applies interpolation processing to the second input image to generate a second interpolated image; and a weighted addition processing portion 65 that receives the high-resolution image and either the first or second interpolated image and that performs weighted addition processing on those two received images to generate a weighted added image. Either the high-resolution image or the weighted added image is output as an output image from the super-resolution processing portion 60.

Although FIG. 2 shows a case where the number of first input images that are fused together in the high-resolution image generation portion 61 is four, the number of first input images may be n (where n is an integer of two or more). For the sake of concrete description, however, the following description deals with a case where the number of first input images is four.

Figure 3:
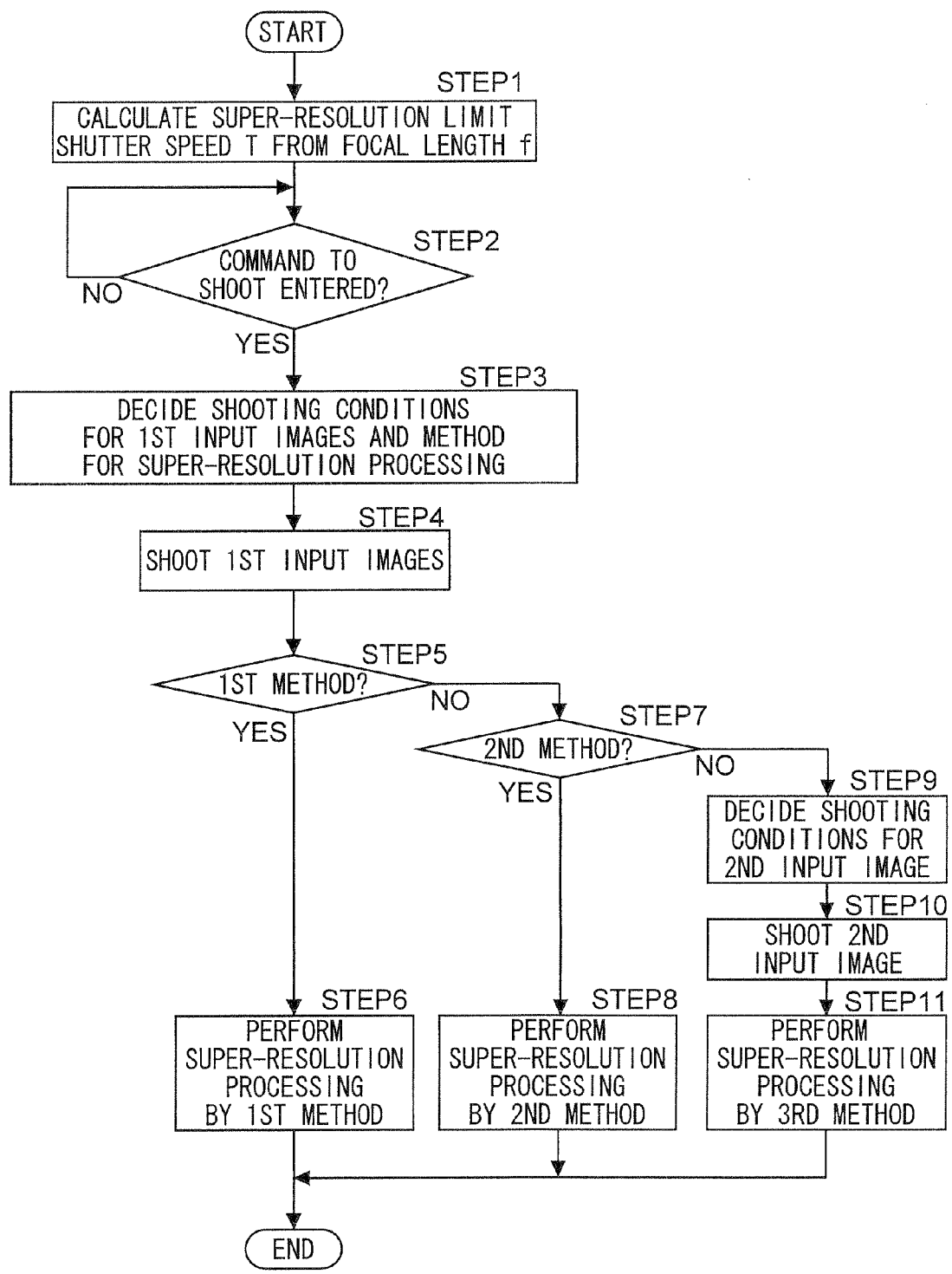
FIG. 3 is a flow chart showing the operation of a super-resolution processing portion in an image-shooting apparatus embodying the invention.

Next, the operation of the super-resolution processing portion 60 will be described with reference to FIG. 3. FIG. 3 is a flow chart showing the operation of the super-resolution processing portion in an image-shooting apparatus embodying the invention. As shown in FIG. 3, when a shooting mode in which super-resolution processing by the super-resolution processing portion 60 is performed (hereinafter referred to as "super-resolution shooting mode") is started, first, the super-resolution limit shutter speed T corresponding to the set focal length f is calculated (STEP 1).

The super-resolution limit shutter speed T is the lower-limit (slowest permissible) shutter speed at or over which the super-resolution processing by the super-resolution processing portion 60 can achieve resolution enhancement by giving the output image a resolution equal to or higher than that of the input images. More specifically, it is a shutter speed faster than the ordinary camera shake limit shutter speed, and is the lower-limit shutter speed at or over which an image obtained by shooting can contain high-frequency components equal to or higher than the Nyquist frequency or folding noise. Shutter speed is expressed in terms of time, and therefore the shorter the time given as a shutter speed is, the faster (greater) the shutter speed is.

For 35 mm film cameras, the camera shake limit shutter speed is commonly given, in terms of the focal length f (mm), as $1/f$ (seconds). For digital cameras, on which images are commonly viewed enlarged, it is preferable that the camera shake limit shutter speed be considered to be faster, about $1/(2 \times f)$ (where f is the 35 mm film equivalent focal length). This camera shake limit shutter speed is defined to ensure that hardly any blur resulting from camera shake is noticeable in an image obtained by shooting. Thus, so that an image obtained by shooting can contain high-frequency components equal to or higher than the Nyquist frequency or folding noise, a shutter speed faster still than that camera shake limit shutter speed needs to be used to further reduce the effect of camera shake. Accordingly, for example, the super-resolution limit shutter speed T is set at about 2 to 2.5 times the above camera shake limit shutter speed 1/(2×f) for digital cameras. Specifically, for example, it may be set at 1/(5×f).

The first input images are obtained by shooting at a shutter speed faster than the super-resolution limit shutter speed T thus set, and therefore can contain high-frequency components equal to or higher than the Nyquist frequency or folding noise. Thus, it is possible to obtain a sufficient effect of super-resolution processing (processing whereby a resolution-enhanced output image is generated through restoration of high-frequency components, or cancellation of folding noise, in input images).

After the super-resolution limit shutter speed T is set at STEP 1, next, whether or not a command to shoot is entered is checked (STEP 2). A command to shoot is entered into the image-shooting apparatus 1, for example, by the press of a shoot button provided in the operation portion 16. So long as no command to shoot is entered ("NO" at STEP 2), a wait lasts until one is entered.

When a command to shoot is entered ("YES" at STEP 2), next, the shooting conditions for the first input images and the method for super-resolution processing are decided. The method for super-resolution processing is how super-resolution processing is performed by use of the first and second input images, and is thus how the super-resolution processing portion 60 shown in FIG. 2 performs super-resolution processing. In the example under discussion, super-resolution processing is performed by one of a first to a third method, and these different methods for super-resolution processing will be individually described in detail later.

The decision of the shooting conditions for the first input images and the method for super-resolution processing is made based on EV (exposure value). EV indicates the illuminance of the subject captured by the image-shooting portion, and is also called the amount, or stops (or steps), of exposure. Decided based on EV are, for example, aperture value, ISO (International Organization for Standardization) sensitivity, and shutter speed. Here, both aperture value and ISO sensitivity are values that express exposure. Aperture value represents the amount of light falling on the image sensor 2, and ISO sensitivity represents the sensitivity of the image sensor.

A smaller aperture value means an increased amount of light falling on the image sensor 2, resulting in a lighter image obtained. On the other hand, an increased ISO sensitivity value means a higher sensitivity of the image sensor 2, resulting in a lighter image obtained. Specifically, $2^{1/2}$ times a given aperture value results in half the original brightness, and half a given ISO sensitivity results in half the original brightness. The illuminance under which an ISO sensitivity of 50, an aperture value of 1, and a shutter speed of 1 second yield a proper exposure is defined as EV0.

Figure 4:
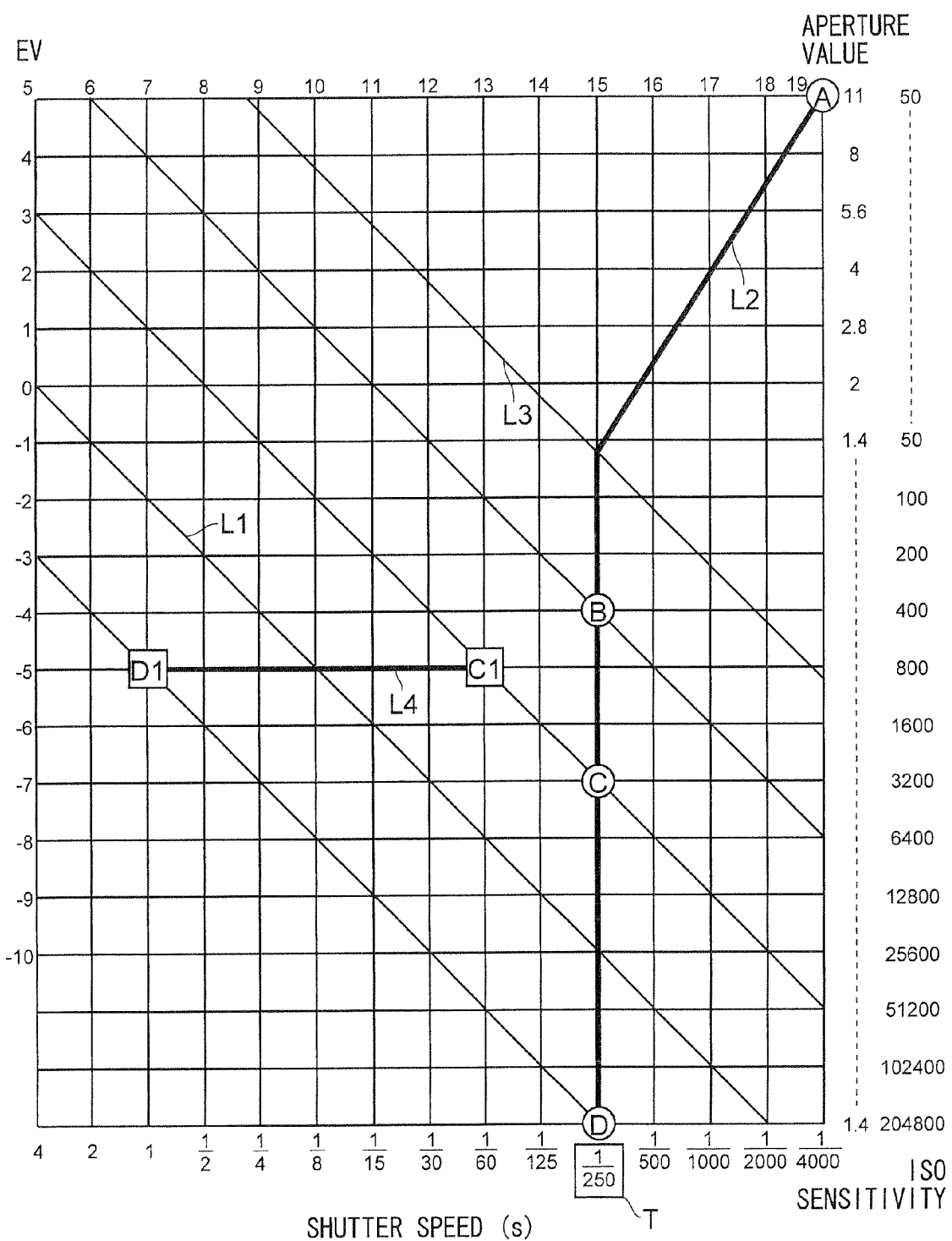
FIG. 4 is a program line diagram showing an example of a method for deciding the shooting conditions for first input images and the method for super-resolution processing.

Now a description will be given of a specific example of the method for deciding the shooting conditions for first input images and the method for super-resolution processing at STEP 3 with reference to the relevant drawing. FIG. 4 is a program line diagram showing an example of the method for deciding the shooting conditions for first input images and the method for super-resolution processing. The program line diagram in FIG. 4 illustrates a case where the focal length is 50 mm and the super-resolution limit shutter speed T is 1/250 seconds.

In FIG. 4, along the vertical line are taken aperture value and ISO sensitivity. In this example, lightness is controlled by aperture value so long as it can (in that case, the ISO sensitivity is kept constant at 50). When the aperture value is already 1.4 (the maximum aperture) and the image needs to be lighter still, then the ISO sensitivity is controlled (in that case, the aperture value is kept constant at 1.4). In FIG. 4, going one graduation up the vertical axis reduces the lightness by half, and going one graduation down doubles the lightness. On the other hand, along the horizontal axis is taken shutter speed. Going one graduation right along the horizontal axis approximately halves the shutter speed value, meaning a faster shutter speed, and Going one graduation left along the horizontal axis approximately doubles the shutter speed value, meaning a slower shutter speed.

By use of a program line diagram as shown in FIG. 4, a proper exposure for an EV is determined. For example, any point on the diagonal line (running from upper left to lower right across graduations) corresponding to a given EV indicates the proper exposure for that EV. For example, when the EV is 0 (diagonal line L1), the proper exposure is obtained with, among many others, the combination of a shutter speed of 2 seconds, an ISO sensitivity of 50, and an aperture value of 1.4, or the combination of a shutter speed of 1/250 seconds, an ISO sensitivity of 25600, and an aperture value of 1.4.

Here, in this example, the shooting conditions for first input images are decided such that the decided shutter speed is equal to or faster than the super-resolution limit shutter speed T. In particular, the shooting conditions indicated by the intersection between line L2 defining the shooting conditions for first input images and the diagonal line corresponding to an EV are taken as the shooting conditions for first input images. Line L2 indicates that, the larger the amount of light entering the image-shooting portion (the larger the amount of exposure), the faster the shutter speed. It however also indicates that, at an illuminance lower than a certain level (corresponding to an EV of about 9, indicated by diagonal line L3), the shutter speed is kept constant at the super-resolution limit shutter speed T.

In the manner described above, the shutter speed, the aperture value, and the ISO sensitivity are decided. Simultaneously, the method for super-resolution processing is also decided. In the example shown in FIG. 4, when the shooting conditions between points A and B on line L2 are used (when the EV is 6 or more), a first method is used; similarly, when the shooting conditions between points B and C on line L2 are used (when the EV is 3 or more but less than 6), a second method is used, and, when the shooting conditions between points C and D on line L2 are used (when the EV is less than 3), a third method is used.

That is, as the amount of light entering the image-shooting portion decreases (as the amount of exposure lowers), and thus as the aperture value decreases and the ISO sensitivity increases, the first, second, and third methods are selected one after another in the order named.

After the shooting conditions for first input images and the method for super-resolution processing are decided at STEP 3, next, first input images are shot (STEP 4). At this time, a plurality of first input images are shot continuously; for example, as in the example shown in FIG. 2, four of them are shot.

After first input images are shot at STEP 4, next, super-resolution processing is performed according to the method for super-resolution processing decided at STEP 3. Here, if the first method is selected ("YES" at STEP 5), super-resolution processing is performed by the first method (STEP 6) to completion. The first method is a method whereby a high-resolution image is generated by use of first input images alone.

If not the first method ("NO" at STEP 5) but the second method is selected ("YES" at STEP 7), super-resolution processing is performed by the second method (STEP 8) to completion. The second method is similar to the first method in that it is a method whereby a high-resolution image is generated by use of first input images alone.

If the second method is not selected either ("NO" at STEP 7), the third method ought to be selected. The third method is a method whereby a high-resolution image is generated by use of first input images and a second input image. Accordingly, now, a second input image is shot. First, the shooting conditions for a second input image are decided (STEP 9). The method for deciding the shooting conditions for a second input image will now be described with reference to FIG. 4.

The method for deciding the shooting conditions for a second input image is similar to the method for deciding the shooting conditions for first input images. Specifically, the shooting conditions indicated by the intersection between line L4 defining the shooting conditions for a second input image and the diagonal line corresponding to an EV are taken as the shooting conditions for a second input image. Line L4 is here taken, for example, such that the ISO sensitivity remains constant at 800 and the aperture value remains constant at 1.4. Points C1 and D1 indicate the points where the same EVs (3 and −3 respectively) are obtained as at points C and D when the proper exposure is obtained.

A second input image is shot at a shutter speed slower than the super-resolution limit shutter speed T. For example, when the EV is 0, a second input image is shot under the following shooting conditions: a shutter speed of ⅛ seconds, an ISO sensitivity of 800, and an aperture value of 1.4.

After the shooting conditions for a second input image are decided at STEP 9, next, a second input image is shot (STEP 10). Then, by use of the first input images and the second input image, super-resolution processing is performed by the third method to completion.

It should be understood that the program line diagram shown in FIG. 4 is merely an example, and that line L2 may vary with the focal length etc.

Different Methods for Super-Resolution Processing

Figure 5:
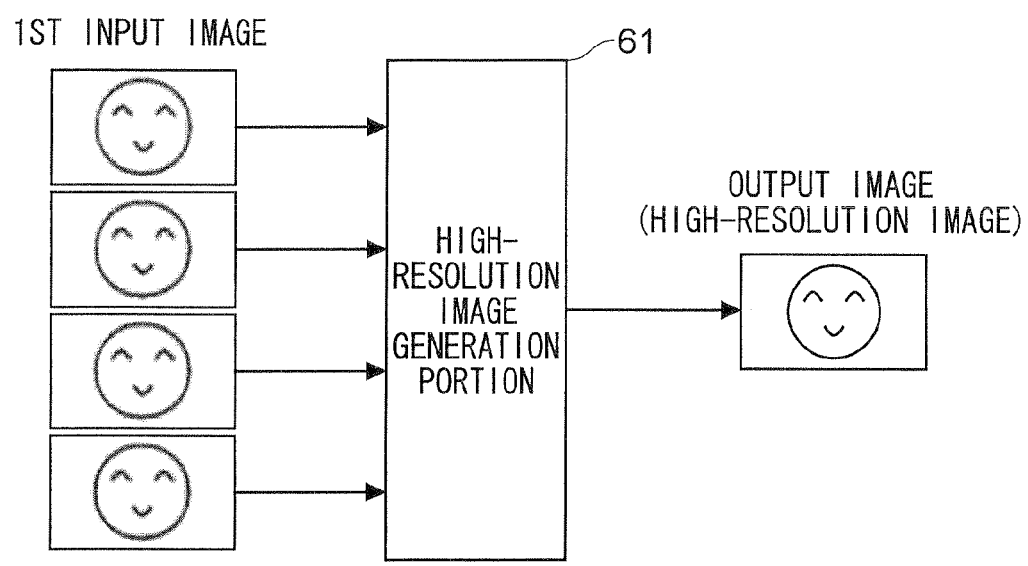
FIG. 5 is a diagram showing a first method for super-resolution processing.
Figure 6:
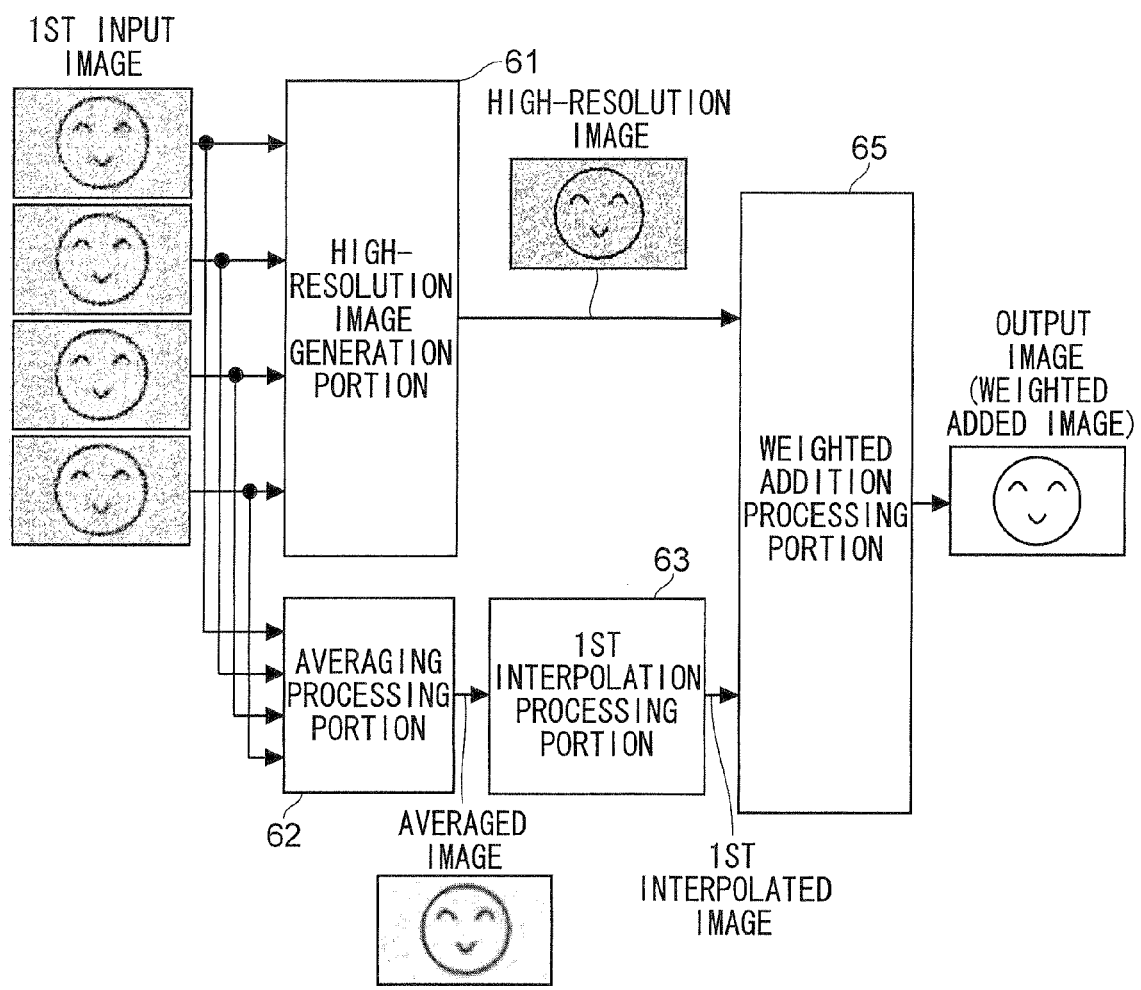
FIG. 6 is a diagram showing a second method for super-resolution processing.
Figure 7:
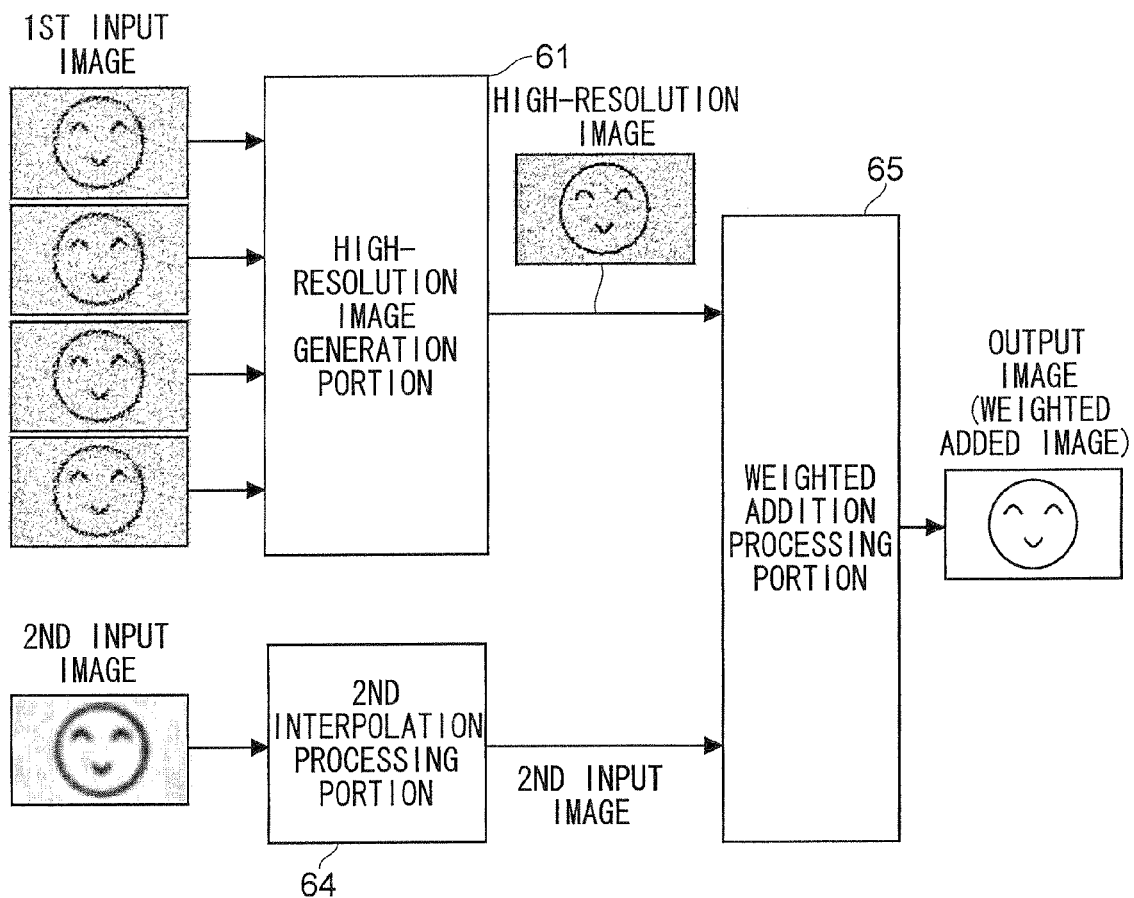
FIG. 7 is a diagram showing a third method for super-resolution processing.

Next, the first to third method for super-resolution processing will be described with reference to the relevant drawings. FIGS. 5 to 7 are diagrams illustrating the first to third method for super-resolution processing respectively. In these diagrams, such parts as are also shown in FIG. 2 are identified by common reference signs, and no detailed description of them will be repeated.

First Method: As shown in FIG. 5, the first method for super-resolution processing is processing by which a plurality of first input images are fused together in the high-resolution image generation portion 61 and the high-resolution image output from it is, as it is, fed out as an output image. The high-resolution image generation portion 61 will be described in detail later.

As described previously, situations where the first method is selected are those where the EV is so great that a fast shutter speed can be selected with a low ISO sensitivity. This yields satisfactory first input images with little noise. Thus, the high-resolution image output from the high-resolution image generation portion 61 can, as it is, be used as an output image.

Second Method: As shown in FIG. 6, according to the second method for super-resolution processing, first, as in the first method, a plurality of first input images are fused together in the high-resolution image generation portion 61 to generate a high-resolution image. In addition, the plurality of first input images are averaged in the averaging processing portion 62 to generate an averaged image. The averaged image thus generated is subjected to interpolation processing by the first interpolation processing portion 63 to generate a first interpolated image having pixels corresponding to those of the high-resolution image. Then the high-resolution image and the first interpolated image are subjected to weighted addition processing by the weighted addition processing portion 65, and the weighted added image thus generated is taken as an output image. The high-resolution image generation portion 61 and the weighted addition processing portion 65 will be described in detail later.

The averaging processing portion 62 calculates the individual pixel values of the averaged image by, for example, calculating the arithmetic means between corresponding pixels (those showing the same part of the subject). At this time, displacements among the first input images may be corrected so that arithmetic means may be calculated between corresponding pixels or the like. The magnitude (amount) of such displacement may be calculated by a method such as representative point matching, which will be described later.

By use of the pixel values of the averaged image fed to it, the first interpolation processing portion 63 generates new pixels (interpolating pixels) and thereby increases the number of pixels. In particular, the pixel value of an interpolating pixel may be calculated through linear interpolation using the pixel values of pixels around the position at which the interpolating pixel is going to be generated. Through such processing, the number of pixels of the averaged image, which is a low-resolution image, is increased so that the first interpolated image has pixels corresponding one-to-one to those of the high-resolution image. Then, when the high-resolution image and the first interpolated image are subjected to weighted addition processing in the weighted addition processing portion 65 provided at the succeeding stage, weighted addition is performed between corresponding pixels.

As described above, situations where the second method is selected is those where the EV is comparatively small so that a fast shutter speed (the super-resolution limit shutter speed T) requires a somewhat high ISO sensitivity. This yields first input images containing rather much noise. Accordingly, the high-resolution image output from the high-resolution image generation portion 61 contains rather much noise.

To cope with this, the plurality of first input images are subjected to averaging processing in the averaging processing portion 62; since noise occurs randomly, the averaged image thus generated, though having a lower resolution than the high-resolution image output from the high-resolution image generation portion 61, has reduced noise. Thus, by subjecting the first interpolated image based on this averaged image along with the high-resolution image to weighted addition processing in the weighted addition processing portion 65, it is possible to combine the merits of the two images.

Specifically, in edge parts, where pixel values vary much (e.g., at a boundary between different objects, or at an outline of an object, within an image), the high-resolution image is added in a greater proportion; elsewhere, that is, in flat parts, where pixel values vary little, the first interpolated image is added in a greater proportion.

With the configuration described above, it is possible to make edge parts, where pixel values vary much, sharp, and thereby enhance the resolution. On the other hand, in flat portions, where pixel values vary little and sharpening is little needed, it is possible to reduce noise. Thus, it is possible to achieve, in the output image, both resolution enhancement and noise reduction effectively.

Depending on the high-resolution image generated, the first interpolation processing portion 63 may not need to perform interpolation processing. This is the case, for example, when the high-resolution image and the first input images have the same number of pixels. In that case, the first interpolated image may be the same as the averaged image.

Third Method: As shown in FIG. 7, according to the third method, first, as in the first or second method, a plurality of first input images are fused together in the high-resolution image generation portion 61 to generate a high-resolution image. In addition, a second input image is shot and is thereby generated. The second input image is subjected to interpolation processing in the second interpolation processing portion 64 to generate a second interpolated image having pixels corresponding to those of the high-resolution image. Then the high-resolution image and the second interpolated image are subjected to weighted addition processing by the weighted addition processing portion 65, and the weighted added image thus generated is taken as an output image. The high-resolution image generation portion 61 and the weighted addition processing portion 65 will be described in detail later.

The second interpolation processing portion 64 operates similarly to the first interpolation processing portion 63. Specifically, by use of the pixel values of the second input image fed to it, the second interpolation processing portion 64 generates interpolating pixels and thereby increases the number of pixels. Thus, the number of pixels of the second input image, which is a low-resolution image, is increased so that the second interpolated image has pixels corresponding one-to-one to those of the high-resolution image. Then, when the high-resolution image and the second interpolated image are subjected to weighted addition processing in the weighted addition processing portion 65 provided at the succeeding stage, weighted addition is performed between corresponding pixels.

As described previously, situations where the third method is selected is those where the EV is so small that a fast shutter speed (the super-resolution limit shutter speed T) requires a high ISO sensitivity. Thus, the first input images contain much noise. Accordingly, the high-resolution image output from the high-resolution image generation portion 61 contains much noise.

To cope with this, the third method uses a second input image shot at a slow shutter speed. Shot at a slow shutter speed, the second input image tends to suffer camera shake, and tends to be blurred. Since, however, a low ISO sensitivity can be used, the noise contained in the image can be reduced. Thus, by subjecting the second interpolated image based on this second input image along with the high-resolution image to weighted addition processing in the weighted addition processing portion 65, it is possible to combine the merits of the two images.

Specifically, as in the second method, in edge parts, where pixel values vary much, the high-resolution image is added in a greater proportion, and elsewhere, that is, in flat parts, where pixel values vary little, the first interpolated image is added in a greater proportion.

With the configuration described above, as with the second method, it is possible, in edge parts, where pixel values vary much, to enhance the resolution and make the output image sharp and, in flat portions, where pixel values vary little and sharpening is little needed, to reduce noise effectively. Moreover, with the third method, use of the second input image, which is expected to contain less noise than the averaged image used in the second method, makes it possible to further reduce the noise contained in the weighted added image.

As with the second method, Depending on the high-resolution image generated, the second interpolation processing portion 64 may not need to perform interpolation processing. In that case, the second interpolated image may be the same as the second input image.

As described above, by deciding the shooting conditions for low-resolution images and the method for super-resolution processing according to the shooting situation (in particular, the amount of light entering the image-shooting portion (the amount of exposure)), it is possible to generate a high-resolution image with little noise. In particular, it is possible to enhance resolution with a faster shutter speed, and to reduce the noise that can result from the faster shutter speed.

Specific Example of Different Parts of Super-Resolution Processing Portion

High-Resolution Image Generation Portion

A description will now be given of a specific example of the high-resolution image generation portion 61 provided in the super-resolution processing portion 60. FIGS. 8A to 8D and 9A to 9D are diagrams showing an outline of the operation of the high-resolution image generation portion. It should be understood that the example described below is merely an example, and that any other method may be adopted so long as it can generate a high-resolution image by use of a low-resolution image.

In the following description, for the sake of simple description, considered will be a plurality of pixels arrayed in one given direction in first input images. The example described below takes up a case where two first input images are fused together to generate a high-resolution image and where pixel values are luminance values.

Figure 8A:
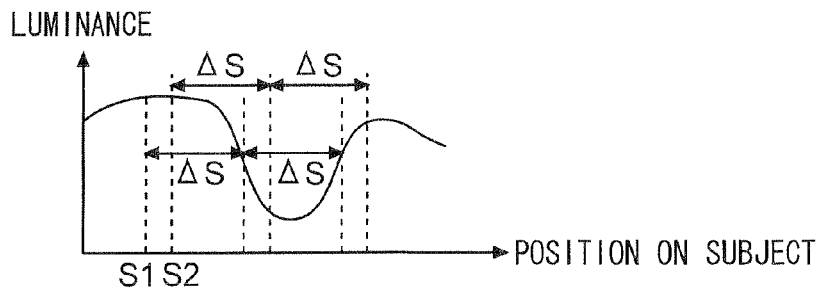
FIG. 8A is a graph showing the luminance distribution of a subject to be shot.
Figure 8B:
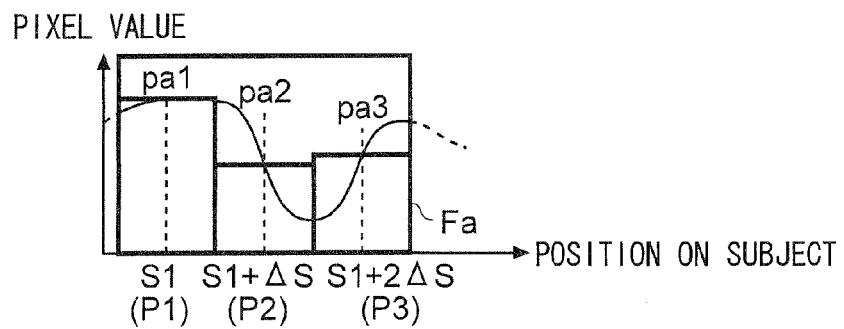
FIG. 8B shows a first input image obtained when the subject shown in FIG. 8A is shot.
Figure 8C:
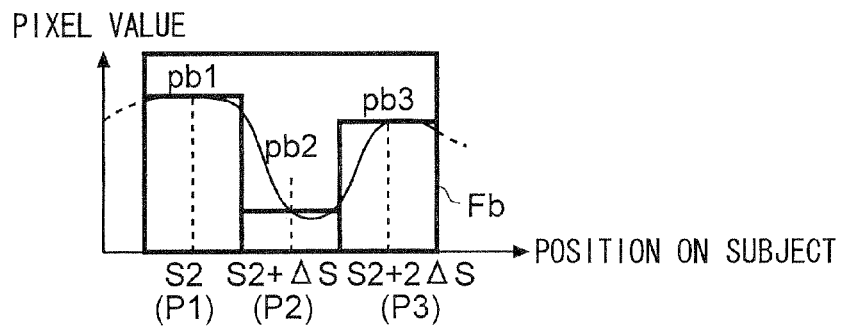
FIG. 8C shows a first input image obtained when the subject shown in FIG. 8A is shot.
Figure 8D:
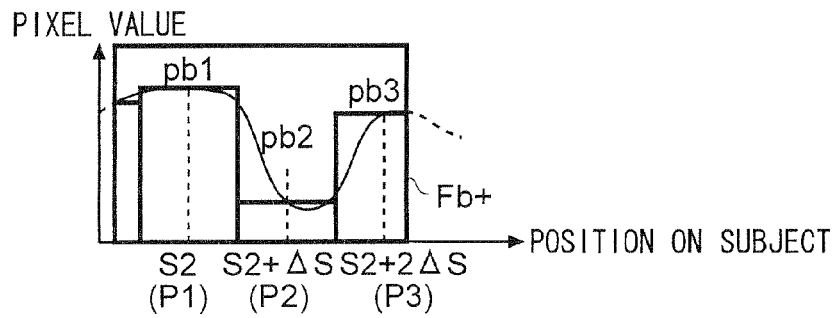
FIG. 8D shows an image obtained by shifting the first input image shown in FIG. 8C by a predetermined amount.

FIG. 8A is a graph showing the luminance distribution of a subject to be shot. FIGS. 8B and 8C show first input images acquired by shooting the subject shown in FIG. 8A. FIG. 8D shows an image obtained by shifting the first input image shown in FIG. 8C by a predetermined amount. It is assumed that, as described previously, the first input image shown in FIG. 8B (hereinafter referred to as actual low-resolution image Fa) and the first input image shown in FIG. 8C (hereinafter referred to as actual low-resolution image Fb) are obtained by continuous shooting. That is, actual low-resolution images Fa and Fb are shot at time points slightly apart from each other.

As shown in FIG. 8B, let the positions of sample points in actual low-resolution image Fa obtained by shooting the subject having the luminance distribution shown in FIG. 8A at time point T1 be S1, S1+ΔS, and S1+2ΔS. On the other hand, as shown in FIG. 8C, let the positions of sample points in actual low-resolution image Fb obtained by shooting at time point T2 be S2, S2+ΔS, and S2+2ΔS. It is here assumed that sample point SI in actual low-resolution image Fa and sample point S2 in actual low-resolution image Fb are displaced from each other due to camera shake or the like.

Sample points S1, S1+ΔS, and S1+2ΔS represent sample points on the subject; in actual low-resolution image Fa shown in FIG. 8B, the luminance values obtained at those sample points S1, S1+ΔS, and S1+2ΔS become pixel values pa1, pa2, and pa3 at pixels P1, P2, and P3. Likewise, sample points S2, S2+ΔS, and S2+2ΔS also represent sample points on the subject; in actual low-resolution image Fb shown in FIG. 8C, the luminance values obtained at those sample points S2, S2+ΔS, and S2+2ΔS become pixel values pb1, pb2, and pb3 at pixels P1, P2, and P3.

Thus, pixel values pa1, pa2, and pa3 at pixels P1, P2, and P3 in actual low-resolution image Fa have a relationship as shown in FIG. 8B. On the other hand, pixel values pb1, pb2, and pb3 at pixels P1, P2, and P3 in actual low-resolution image Fb have a relationship as shown in FIG. 8C. Actual low-resolution image Fa shown in FIG. 8B and actual low-resolution image Fb shown in FIG. 8c have their pixels displaced by (S1-S2) in terms of pixel positions. Thus, when actual low-resolution image Fb is expressed in relation to pixels P1, P2, and P3 in actual low-resolution image Fa (i.e., when the displacement of actual low-resolution image Fb is corrected by its amount of movement relative to actual low-resolution image Fa), the displacement-corrected actual low-resolution image Fb+ is as shown in FIG. 8D.

Figure 9A:
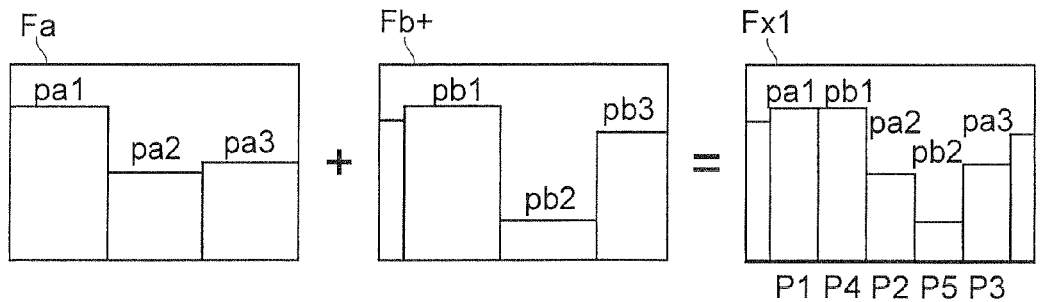
FIG. 9A is a diagram showing a method for estimating a high-resolution image from actual low-resolution images.

FIGS. 9A to 9D show a method for generating a high-resolution image by combining together actual low-resolution image Fa shown in FIG. 8B and actual low-resolution image Fb+ shown in FIG. 8D. First, as shown in FIG. 9A, actual low-resolution image Fa and actual low-resolution image Fb+ are combined together to estimate a high-resolution image Fx1. For the sake of simple description, it is here assumed that the resolution is going to be doubled in one given direction. Specifically, the pixels of high-resolution image Fx1 will include, in addition to pixels P1, P2, and P3 of actual low-resolution images Fa and Fb+, pixel P4 located halfway between pixels P1 and P2 and pixel P5 located halfway between pixels P2 and P3.

When actual low-resolution image Fa is taken as the image of interest, i.e., the reference, pixel values pa1, pa2, and pa3 in actual low-resolution image Fa are taken as the pixel values at pixels P1, P2, and P3. Selected as the pixel value at pixel P4 is, it is here assumed, pixel value pb1, because the distance from the pixel position of pixel P1 to that of pixel P4 in actual low-resolution image Fb+ is shorter than the distances from the pixel positions of pixels P1 and P2 to that of pixel P4 in actual low-resolution image Fa. Likewise, selected as the pixel value at pixel P5 is, it is here assumed, pixel value pb2, because the distance from the pixel position of pixel P2 to that of pixel P5 in actual low-resolution image Fb+ is shorter than the distances from the pixel positions of pixels P2 and P3 to that of pixel P5 in actual low-resolution image Fa.

Figure 9B:
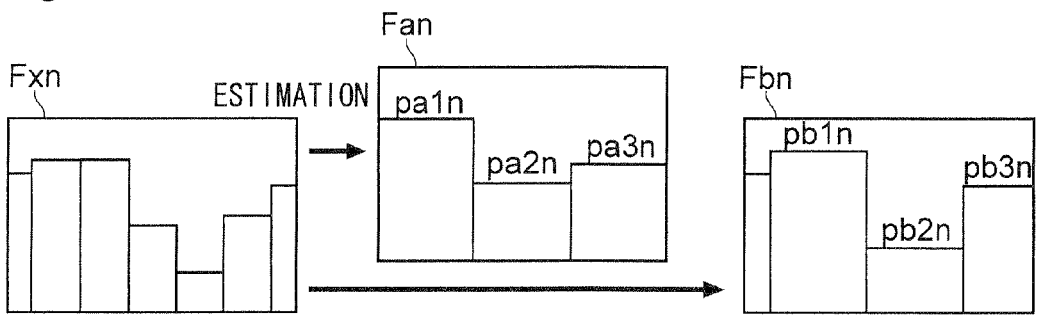
FIG. 9B is a diagram showing a method for estimating estimated low-resolution images from a high-resolution image.

Thereafter, as shown in FIG. 9B, high-resolution image Fx1 thus obtained is subjected to calculation according to a conversion formula including, as parameters, the amount of down sampling, the amount of blur, the amount of displacement (corresponding to the amount of movement), etc., thereby to generate estimated low-resolution images Fa1 and Fb1 corresponding to actual low-resolution images Fa and Fb respectively. In FIG. 9B, there are shown estimated low-resolution images Fan and Fbn estimated from high-resolution image Fxn, that is, the high-resolution image estimated through the processing performed for the nth time.

When n=1, based on high-resolution image Fx1 obtained by a method as shown in FIG. 9A, the pixel values at sample points S1, S1+ΔS, and S1+2ΔS are estimated, and an estimated low-resolution image Fa1 is generated that has the thus acquired pixel values pa11 to pa31 as the pixel values at pixels P1 to P3. Likewise, based on high-resolution image Fx1, the pixel values at sample points S2, S2+ΔS, and S2+2ΔS are estimated, and an estimated low-resolution image Fb1 is generated that has the thus acquired pixel values pb11 to pb31 as the pixel values at pixels P1 to P3.

Figure 9C:
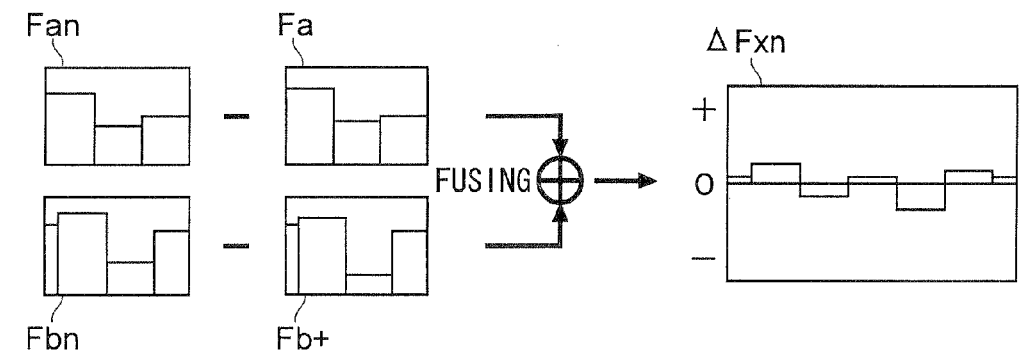
FIG. 9C is a diagram showing a method for generating a differential image from estimated low-resolution images and actual low-resolution images.

Then, as shown in FIG. 9C, the differences between each of estimated low-resolution images Fa1 and Fb1 and the corresponding one of actual low-resolution images Fa and Fb acquired by shooting are determined, and these differences are fused together to acquire a differential image ΔFx1 with respect to high-resolution image Fx1. In FIG. 9C, there is shown differential image ΔFxn with respect to high-resolution image Fxn acquired through the processing performed for the nth time, that is, differential image ΔFxn obtained by fusing together differential images ΔFan and ΔFbn between estimated low-resolution images Fan and Fbn and actual low-resolution images Fa and Fb+.

Determined through the processing shown in FIG. 9C are a differential image ΔFa1 based on the differences (pa11−pa1), (pa21−pa2), and (pa31−pa3) at pixels P1, P2, and P3 between estimated low-resolution image Fa1 and actual low-resolution image Fa and a differential image ΔFb1 based on the differences (pb11−pb1), (pb21−pb2), and (pb31−pb3) at pixels P1, P2, and P3 between estimated low-resolution image Fb1 and actual low-resolution image Fb. That is, differential image ΔFa1 has, as pixel values, the difference values (pa11−pa1), (pa21−pa2), and (pa31−pa3), and differential image ΔFb1 has, as pixel values, the difference values (pb11−pb1), (pb21−pb2), and (pb31−pb3).

Then, by fusing together the pixel values of differential images ΔFa1 and ΔFb1, the difference values at pixels P1 to P5 respectively are calculated, thereby to acquire differential image ΔFx1 with respect to high-resolution image Fx1. Here, when differential image ΔFx1 is acquired by merging together the pixel values of differential images ΔFa1 and ΔFb1, for example in cases where an ML (maximum likelihood) method or a MAP (maximum a posteriori) method is used, squared errors are used as an evaluation function. Specifically, the evaluation function of an ML or MAP method yields values which are frame-to-frame sums of squared pixel values between differential images ΔFa1 and ΔFb1. Thus, the gradient given as the integral of that evaluation function has values twice as great as the pixel values of differential images ΔFa1 and ΔFb1, and accordingly differential image ΔFx1 with respect to high-resolution image Fx1 is calculated through resolution enhancement using values twice as great as the pixel values of each of differential images ΔFa1 and ΔFb1.

Figure 9D:
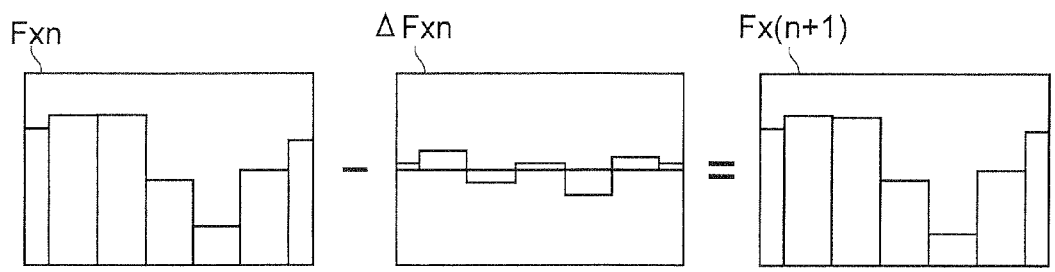
FIG. 9D is a diagram showing a method for reconstructing a high-resolution image from a high-resolution image and a differential image.

Thereafter, as shown in FIG. 9D, the pixel values (difference values) at pixels P1 to P5 in the thus obtained differential image ΔFx1 are subtracted from the pixel values at pixels P1 to P5 in high-resolution image Fx1, and thereby a high-resolution image Fx2 is reconstructed that has pixel values close to the subject having the luminance distribution shown in FIG. 8A. In FIG. 9D, there is shown high-resolution image Fx(n+1) obtained by subtracting differential image ΔFxn from high-resolution image Fxn.

Then, the sequence of processing described above is repeated so that, as the pixel values of differential image ΔFxn thus obtained grow smaller, the pixel values of high-resolution image Fxn converge to pixel values close to the subject having the luminance distribution shown in FIG. 8A. Through the processing performed for the nth time, based on high-resolution image Fxn obtained through the previous processing (performed for the (n−1)th time), estimated low-resolution images Fan and Fbn and high-resolution image Fx(n+1) are acquired. When the pixel values (difference values) of differential image ΔFxn become smaller than a predetermined value, or when the pixel values (difference values) of differential image ΔFxn have converged, the high-resolution image Fxn obtained through the previous processing (performed for the (n−1)th time) is taken as the output of the high-resolution image generation portion 61.

Figure 10:
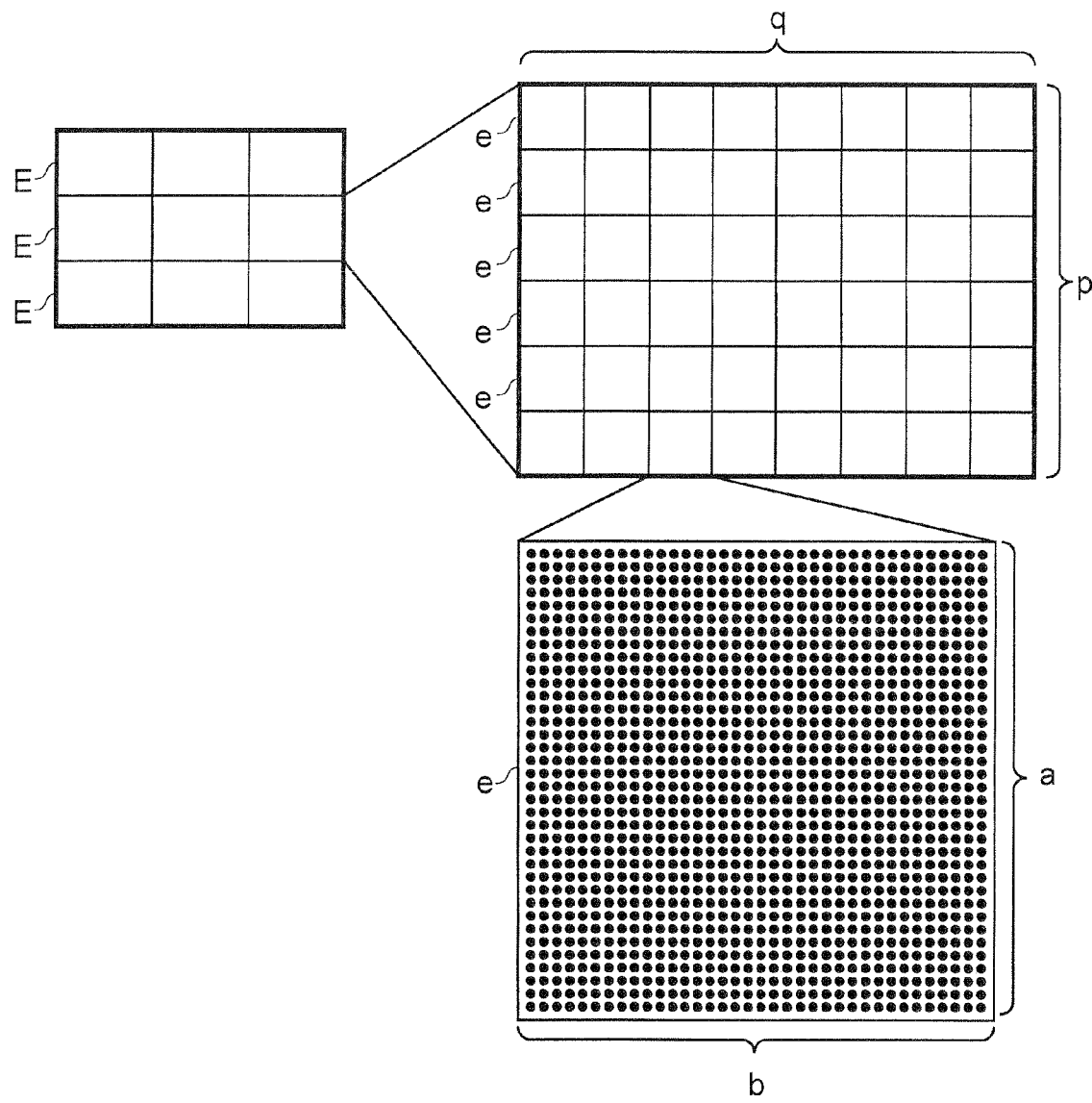
FIG. 10 is a diagram schematically showing how an image is divided into regions in representative point matching.
Figure 11A:
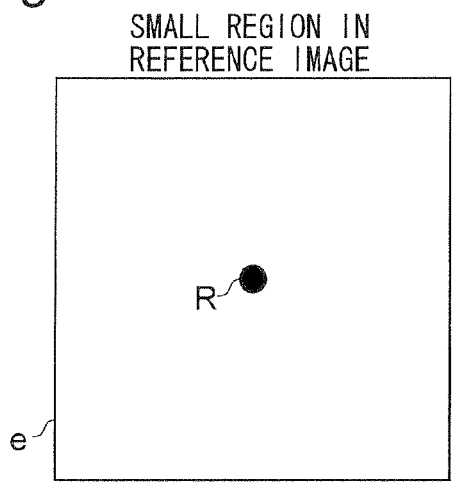
FIG. 11A is a diagram schematically showing a reference image in representative matching.
Figure 11B:
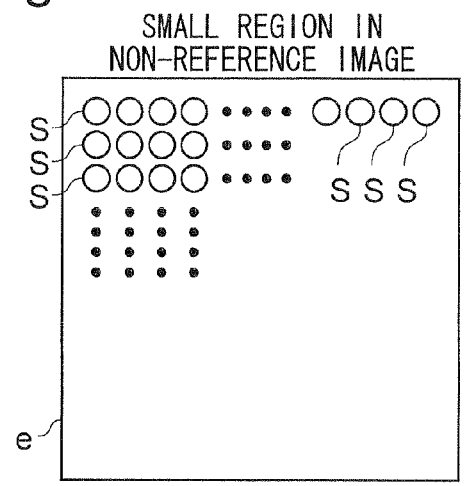
FIG. 11B is a diagram schematically showing a non-reference image in representative matching.

In the above processing, to determine the amount of movement (the amount of displacement), it is possible to use, for example, representative point matching and single-pixel movement amount detection as described below. First, representative point matching, and then single-pixel movement amount detection, will be described with reference to the relevant drawings. FIGS. 10, 11A, and 11B are diagrams illustrating representative point matching. FIG. 10 is a diagram schematically showing how an image is divided into regions, and FIGS. 11A and 11B are diagrams schematically showing a reference image and a non-reference image.

Representative Point Matching: In representative point matching, an image serving as a reference (reference image) and an image compared with the reference image to detect movement (non-reference image) are each divided into regions as shown in FIG. 10. For example, an image is first divided into a plurality of detection regions E, of which each is then further divided into p×q (e.g., 6×8) small regions e, of which each is composed of a group of a×b (e.g., 36×36) pixels.

Moreover, as shown in FIG. 11A, in the reference image, for each small region e, one of the a×b pixels composing it is selected as the representative point R. On the other hand, as shown in FIG. 11B, in the non-reference image, for each small region e, a plurality of the a×b pixels composing it are selected as sampling points S (e.g., all the a×b pixels may be selected as sampling points S).

With the small regions e and the detection regions E set as described above, between the small regions e at the same position in the reference and non-reference images, the difference of the pixel value at each sampling point S in the non-reference image from the pixel value of the representative point R in the reference image is determined as the correlation value at that sampling point S. Then, for each detection region E, the correlation value at any sampling point S whose position relative to the representative point R is the same among different small regions e is added up with respect to all the small regions e composing the detection region E, and thereby the cumulative correlation value at each sampling point S is acquired. In this way, for each detection region E, the correlation values at p×q sampling points S whose position relative to the representative point R is the same are added up, so that as many cumulative correlation values as there are sampling points are obtained (e.g., when all the a×b pixels are selected as sampling points S, a×b cumulative correlation values are obtained).

After, for each detection region E, the cumulative correlation values at individual sampling points S have been determined, then, for each detection region E, the sampling point S considered to have the highest correlation with the representative point R (i.e., the sampling point S with the least cumulative correlation value) is detected. Then, for each detection region E, the amounts of movement of the sampling point S with the least cumulative correlation value and of the representative point R are determined based on their respective pixel positions. Thereafter, the amounts of movement determined for the individual detection regions E are averaged so that the average value is detected as the amount of movement, given in the unit of pixels, between the reference and non-reference images.

Figure 12A:
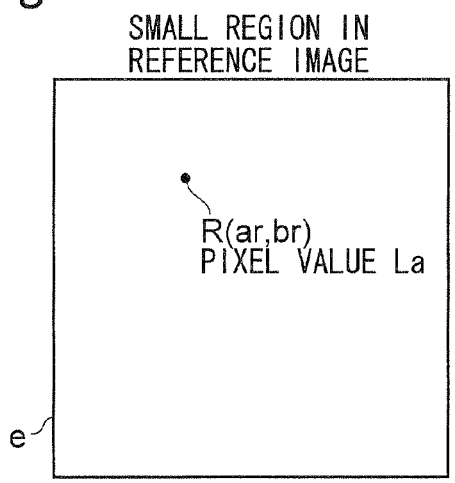
FIG. 12A is a diagram schematically showing a reference image in single-pixel movement amount detection.
Figure 12B:
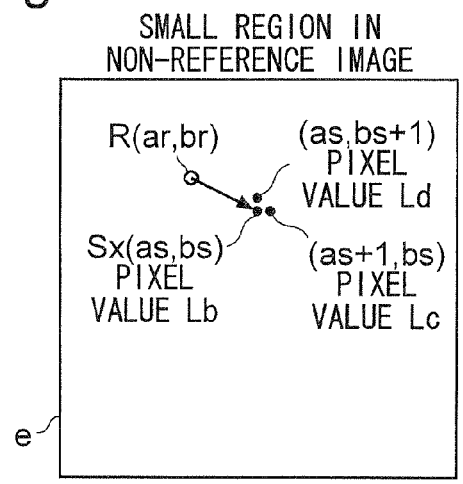
FIG. 12B is a diagram schematically showing a non-reference image in single-pixel movement amount detection.

Single-Pixel Movement Amount Detection: Next, single-pixel movement amount detection will be described with reference to the relevant drawings. FIGS. 12A and 12B are schematic diagrams of a reference image and a non-reference image illustrating single-pixel movement amount detection, and FIGS. 13A and 13B are graphs showing the relationship among the pixels values of reference and sampling points during single-pixel movement amount detection.

After the amounts of movement in the unit of pixels have been detected by use of, for example, representative matching or the like as described above, the amounts of movement within a single pixel can additionally be detected by the method described above. For example, for each small region e shown in FIG. 10, the amount of movement within a single pixel can be detected based on the relationship among the pixel value of the pixel at the representative point R in the reference image and the pixel values of the pixel at, and pixels around, a sampling point Sx with a high correlation with the representative point R.

As shown in FIGS. 12A and 12B, for each small region e, based on the relationship among pixel value La of the representative point R at pixel position (ar, br) in the reference image, pixel value Lb of a sample point Sx at pixel position (as, bs) in the non-reference image, pixel value Lc at pixel position (as+1, bs) horizontally adjacent to the sample point Sx, and pixel value Ld at pixel position (as, bs+1) vertically adjacent to the sample point Sx, the amount of movement within a single pixel is detected. Here, by representative matching, the amount of movement in the unit of pixels from the reference image to the non-reference image is determined as a value expressed by the vector quality (as−ar, bs−br).

Figure 13A:
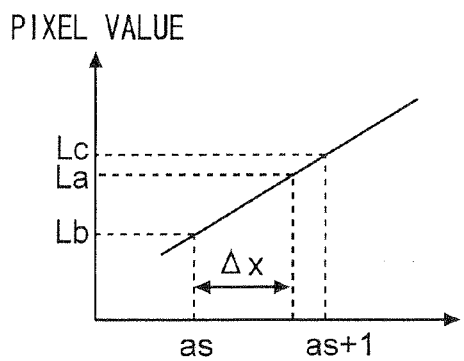
FIG. 13A is a graph showing the relationship in the horizontal direction among the pixel values of reference and sampling points in single-pixel movement amount detection.
Figure 13B:
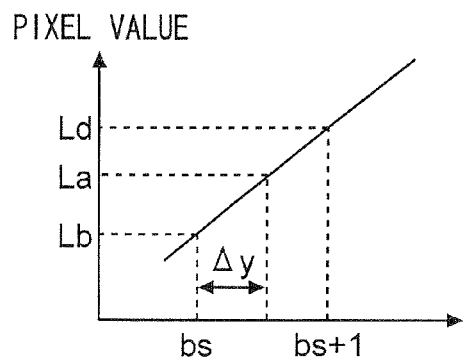
FIG. 13B is a graph showing the relationship in the vertical direction among the pixel values of reference and sampling points in single-pixel movement amount detection.

It is assumed that, as shown in FIG. 13A, deviating one pixel horizontally from the pixel taken as the sample point Sx brings a linear change from pixel value Lb to pixel value Lc. Likewise, it is also assumed that, as shown in FIG. 13B, deviating one pixel vertically from the pixel taken as the sample point Sx brings a linear change from pixel value Lb to pixel value Ld. Then, the horizontal position $\Delta x$ (=(La−Lb)/(Lc−Lb)) between pixel values Lb and Lc at which the pixel value is La, and the vertical position $\Delta y$ (=(La−Lb)/(Ld−Lb)) between pixel values Lb and Ld at which the pixel value is La, are determined. That is, a vector quantity expressed by ($\Delta x$, $\Delta y$) is determined as the amount of movement between the reference and non-reference pixels.

In this way, the amount of movement within a single pixel in each small region e is determined. Then, the average obtained by averaging the amounts of movement thus determined is detected as the amount of movement within a single pixel between the reference image (e.g., actual low-resolution image Fb) and the non-reference image (e.g., actual low-resolution image Fa). Then, by adding the thus determined amount of movement within a single pixel to the amount of movement in the unit of pixels as obtained by representative matching, it is possible to calculate the amount of movement between the reference and non-reference images.

Weighted Addition Processing Portion

Figure 14:
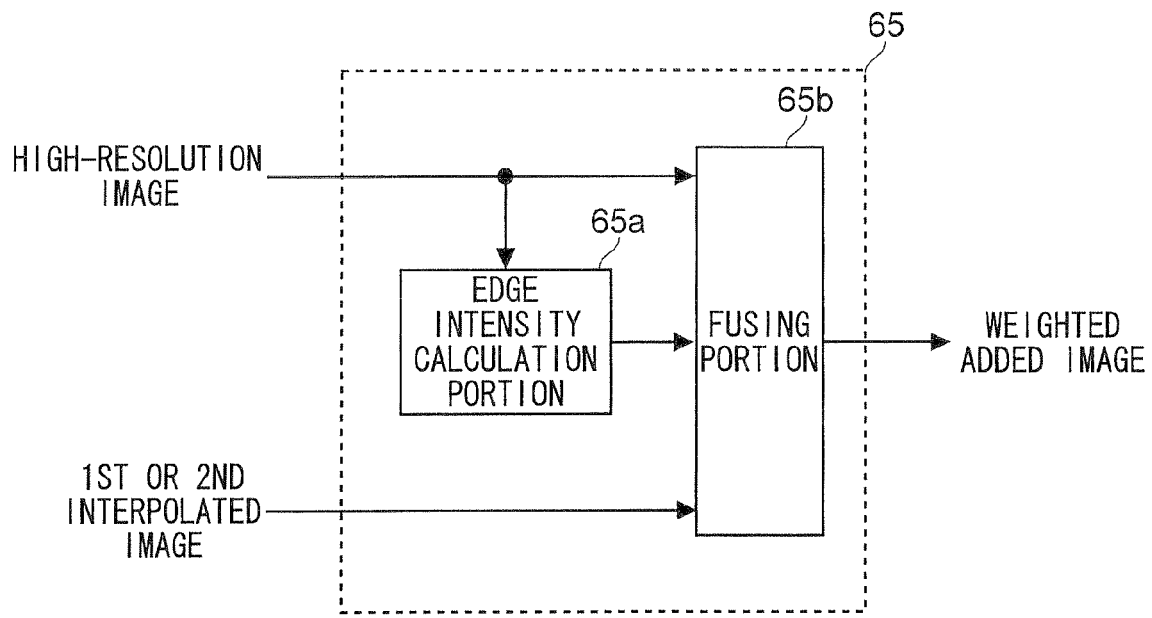
FIG. 14 is a block diagram showing the configuration of a weighted addition processing portion.

Next, a specific example of the weighted addition processing portion 65 provided in the super-resolution processing portion 60 will be described with reference to the relevant drawings. FIG. 14 is a block diagram showing a configuration of the weighted addition processing portion. It should be understood that the configuration described below is merely an example, and that weighted addition processing may be performed with any other configuration and by any other method.

As shown in FIG. 14, in the example under discussion, the weighted addition processing portion 65 is provided with an edge intensity calculation portion 65a that calculates an edge intensity value from the high-resolution image and a fusing portion 65b that fuses the high-resolution image and the first or second interpolated image together in a proportion based on the edge intensity value.

An edge intensity is a value that indicates a variation of a pixel (relative to pixels around it). For example, a value obtained by applying to the high-resolution image a filter (differentiating filter) that extracts an outline can be used as an edge intensity value. Accordingly, the edge intensity calculation portion 65a may be provided with a differentiating filter (e.g., a Sobel filter or Prewitt filter). In the following description, it is assumed that, the greater an edge intensity value is, the larger the variation of a pixel it indicates.

The fusing portion 65b fuses the two images fed to it together on a pixel-by-pixel basis. In particular, based on the edge intensity value of individual pixels to be fused together, the high-resolution image, or the first or second interpolated image, is added in a greater proportion than the other. Specifically, the greater the edge intensity value, the greater the proportion in which the high-resolution image is added; the smaller the edge intensity value, the greater the proportion in which the first or second interpolated image is added.

Figure 15:
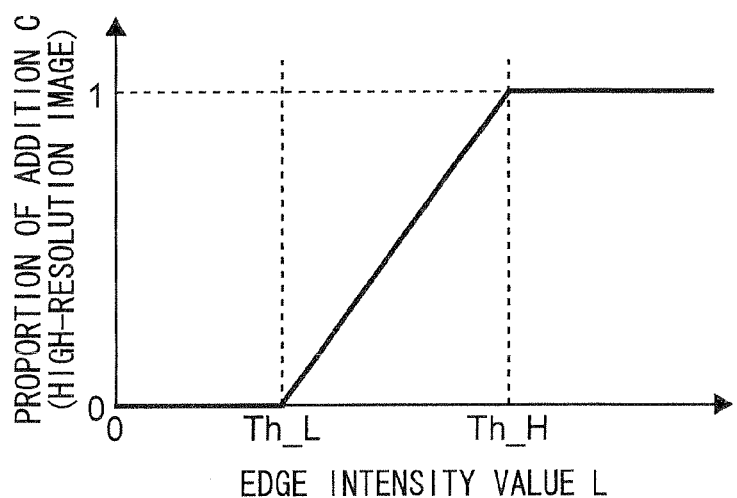
FIG. 15 is a graph showing the relationship between edge intensity value and addition proportion.

An example of how to decide the proportion of addition will now be described with reference to the relevant drawing. FIG. 15 is a graph showing the relationship between the edge intensity value and the proportion of addition. In the graph shown in FIG. 15, taken along the vertical axis is the proportion C in which the high-resolution image is added, the proportion in which the first or second interpolated image is added being (1−C).

As shown in FIG. 15, when the edge intensity value L is less than a threshold value Th_L, the proportion of addition C equals 0; when the edge intensity value L is equal to or more than a threshold value Th_H, the proportion of addition C equal 1; when the edge intensity value L is equal to or more than the threshold value Th_L but less than the threshold value Th_H, the proportion of addition C equals (L−Th_L)/(Th_H−Th_L). That is, as the edge intensity value L increases from the threshold value Th_L to the threshold value Th_H, the proportion of addition C linearly increases from 0 to 1. The increase may be non-linear, but preferably gradual.

With the proportion of addition C set as shown in FIG. 15, in edge parts, where the edge intensity value L is great, it is possible to add the high-resolution image in a greater proportion to sharpen the edge parts and thereby enhance the resolution of the output image. On the other hand, in flat parts, where the edge intensity value L is small, it is possible to add the first or second interpolated image in a greater proportion to reduce noise.

The edge intensity calculation portion 65a may be provided with an LPF (low-pass filter) that eliminates high-frequency components (mainly noise components) from the high-resolution image fed to it. This configuration helps reduce the likelihood of the edge intensity calculation portion 65a erroneously recognizing noise as edge parts, and thus helps reduce noise contained in the weighted added image.

Modifications

Various modifications applicable to the embodiment described above will be described below. Different modifications may be combined together unless incompatible.

Indicating the Selected Method for Super-Resolution Processing

In an image-shooting apparatus 1 embodying the invention, before the first and second input images are shot, which of different methods of super-resolution processing is likely to be selected may be indicated to the user. FIG. 16 is a diagram showing an example of the relationship between different shooting situations and different methods for super-resolution processing.

As described previously, an image-shooting apparatus embodying the invention selects one of different methods for super-resolution processing according to the shooting situation (in particular, the illuminance of the subject). In the example shown in FIG. 16, when the illuminance of the subject is higher than that "in a light room" (400 lux), the first method is used; when the illuminance is lower than that "in a light room" but higher than that "in a lit-up night scene" (50 lux), the second method is used; when the illuminance is lower than that "in a lit-up night scene," the third method is used.

Figure 17A:
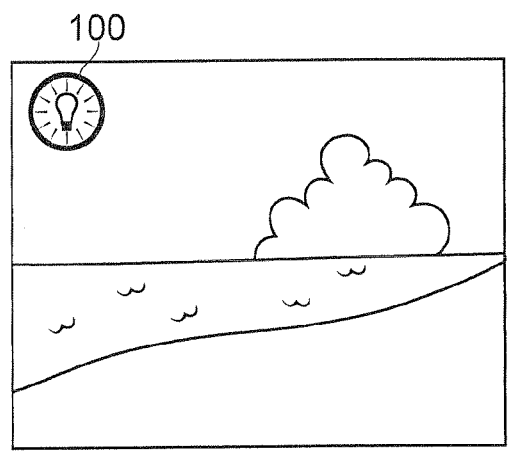
FIG. 17A is a diagram schematically showing an example of a displayed image.
Figure 17B:
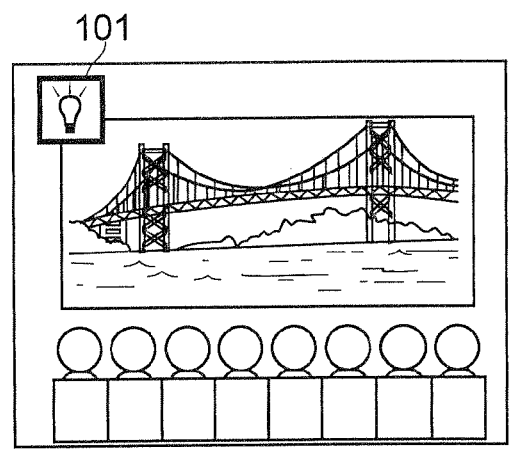
FIG. 17B is a diagram schematically showing an example of a displayed image.
Figure 17C:
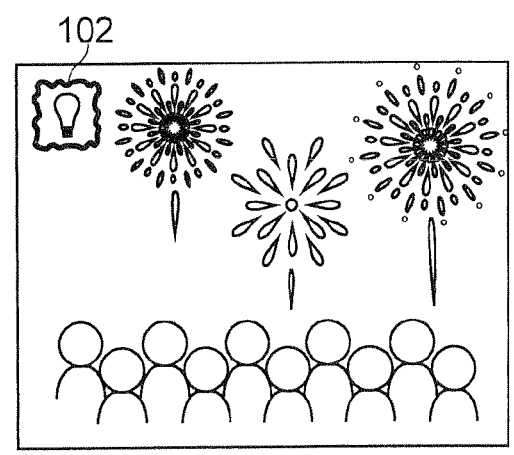
FIG. 17C is a diagram schematically showing an example of a displayed image.

The method for super-resolution processing selected as shown in FIG. 16 may be displayed to the user by use of a display device so that the selected method for super-resolution processing may be indicated to the user. Examples of display in such cases will now be described with reference to FIGS. 17A to 17C. FIGS. 17A to 17C are schematic diagrams showing examples of displayed images. The displayed images shown in FIGS. 17A to 17C are displayed, for example, during previewing.

In cases where such displayed images are displayed during previewing, between STEP 1 (calculation of the super-resolution limit shutter speed T) and STEP 2 (checking of whether or not a command to shoot is entered), there may be additionally provided a step of estimating the method for super-resolution processing that is likely to be selected during shooting and a step of displaying the thus estimated method for super-resolution processing. The method used for estimation may be similar to that used in STEP 3 (deciding the method for super-resolution processing based on the amount of exposure).

FIG. 17A shows a case where shooting is performed outdoors in fine weather; FIG. 17B shows a case where shooting is performed indoors in a dim light; and FIG. 17C shows a case where shooting is performed outdoors at night. In the displayed image shown in FIG. 17A, since the method for super-resolution processing is estimated to he the first method, a mark 100 indicating the first method is displayed in the image. Likewise, in FIG. 17B, a mark 101 indicating the second method is displayed and, in FIG. 17C, a mark 102 indicating the third method is displayed.

Indicating the selected method for super-resolution processing to user in this way makes it possible to alert user during the shooting of the first and second input images. In particular, in a case where possible selection of the third method—requiring the shooting of the second input image, which needs to be shot at a slower shutter speed than the first input images—is indicated, it is possible to alert the user not to produce large camera shake during the shooting of the second input image.

Electronic Zooming Processing

Next, a case where electronic zooming processing is performed in combination with super-resolution processing will be described. Electronic zooming processing is processing whereby part of an image fed in is cut out to output that part on an enlarged scale.

First, a description will be given of a case where the first method is selected. In this case, the high-resolution image generation portion 61 shown in FIG. 2 cuts out part of the high-resolution image generated to generate a high-resolution image (partial). Alternatively, it cuts out parts of the first input images, and by use of the thus cut out images, generates a high-resolution image (partial). Previously cutting out parts of the first input images in the high-resolution image generation portion 61 helps reduce the amount of calculation in the succeeding stages. The processing thus far is performed commonly with the first to third methods.

Next, a description will be given of a case where the second method is selected. In this case, the averaging processing portion 62 shown in FIG. 2 cuts out part of the averaged image generated to generate an averaged image (partial). Alternatively, it cuts out parts of the first input images, and applies averaging processing to the images thus cut out to generate an averaged image (partial). The first interpolation processing portion 63 applies interpolation processing to the averaged image (partial) fed to it to generate a first interpolated image (partial). Then the weighted addition processing portion 65 applies weighted addition processing to the high-resolution image (partial) and the first interpolated image (partial) to output a weighted added image (partial).

Instead of part of an image being cut out in the averaging processing portion 62, part of the first interpolated image generated may be cut out in the first interpolation processing portion 63 to generate a first interpolated image (partial). Previously cutting out parts of the first input images in the averaging processing portion 62, however, helps reduce the amount of calculation in the succeeding stages.

A description will now be given of a case where the third method is selected. In this case, the second interpolation processing portion 64 shown in FIG. 2 cuts out part of the second interpolated image generated to generate a second interpolated image (partial). Alternatively, it cuts out part of the second input image, and applies interpolation processing to the thus cut out image to generate a second interpolated image (partial). Then the weighted addition processing portion 65 applies weighted addition processing to the high-resolution image (partial) and the second interpolated image (partial) to output a weighted added image (partial). Previously cutting out a second interpolated image in the second interpolation processing portion 64 helps reduce the amount of calculation in the succeeding stages.

The output image obtained in the manner described above is an enlarged image of part of the first and second input images. By use of an image-shooting apparatus according to the invention, it is possible to obtain a sharp enlarged image.

File Format of Output Image

When the output image described above is recorded to the external memory 10, an image file of a predetermined file format may be adopted. The file format may be one, as exemplified by Exif (Exchangeable Image File Format) and CIFF (Camera Image File Format), that can associate additional information with the output image. In this case, the additional information may include various kinds of information, for example a thumbnail image of and the shooting date and time of the output image, use or disuse of a flash during shooting, etc.

In this example, it is preferable that the additional information include information indicating the situation in which the output image was generated. Information indicating the situation in which the output image was generated includes information such as the shooting conditions (focal length, shutter speed, aperture value, ISO sensitivity, etc.) of the first and second input images shot to generate the output image, the super-resolution processing method (first, second, or third) that was applied to the first and second input images to generate the output image, etc.

By referring to the additional information and thereby grasping the information indicating the situation in which the output image was generated, the user can confirm whether or not the output image has effective super-resolution processing applied to it.

Shooting Condition Manual Setting Mode

The embodiment described above deals with a case where the above-described super-resolution processing is applied to first and second input images shot in a mode in which the shooting conditions for the first and second input images are set automatically (a so-called automatic setting mode; see STEPs 1, 3, and 9 in FIG. 3). By contrast, this example deals with a case where the above-described super-resolution processing is applied to images shot in a mode in which the user sets the shooting conditions (focal length, shutter speed, aperture value, ISO sensitivity, etc.) (a so-called manual setting mode).

In this example, however, to obtain a properly resolution-enhanced output image, the shutter speed is subjected to restrictions as will be described below. In an ordinary manual setting mode in which no super-resolution processing is performed, the shooting conditions including the shutter speed may be left freely settable by the user.

In the manual setting mode accompanied by super-resolution processing, when the user attempts to set the shutter speed for the shooting of the first input images, the shutter speed is prevented from being set at a shutter speed slower than the super-resolution limit shutter speed T. The super-resolution limit shutter speed T here can be calculated by a method similar to the one described previously (STEP 1 in FIG. 3).

With this configuration, the first input images obtained in the manual setting mode accompanied by super-resolution processing can contain high-frequency components equal to or higher than the Nyquist frequency or folding noise. It is thus possible to generate an output image that has been sufficiently resolution-enhanced by super-resolution processing.

In the manual setting mode accompanied by super-resolution processing, the method for super-resolution processing may be left selectable by the user. Alternatively, while the method for super-resolution processing is decided automatically as in STEP 3 in FIG. 3, the details of the shooting conditions for first input images may be left settable by the user.

In cases where a second input image is needed (e.g., when, in a configuration where the user can select the method for super-resolution processing, he selects the third method, or when, in a configuration where the method for super-resolution processing is selected automatically, the third method is selected, etc.), not only the shooting conditions for the first input images but also the shooting conditions for the second input image may be left settable by the user. Moreover, the shutter speed for the second input image may be prevented from being set at a shutter speed equal to or faster than the super-resolution limit shutter speed T.

With this configuration, the second interpolated image (the image obtained by subjecting the second input image to interpolation processing), which is used to reduced noise when the output image is generated in the weighted addition processing portion 65, can be prevented from containing excessive noise. It is thus possible to reduce the noise contained in the output image obtained.

The manual setting mode accompanied by super-resolution processing may be interpreted as one of the above-described methods for super-resolution processing (e.g., as a fourth method), or may be interpreted as a method for selecting among the first to third methods described above or for setting shooting conditions. In a case where the manual setting mode is interpreted as one of methods for super-resolution processing, a mark indicating that method may be displayed, for example, as in FIGS. 17A to 17C, or information indicating that method may be included in the additional information of the file of the output image.

Optical Camera Shake Correction

The embodiment described above deals with a case where blur is reduced by selecting a fast shutter speed (one equal to or faster than the super-resolution limit shutter speed T) so that the first input images contain high-frequency components equal to or higher than the Nyquist frequency or folding noise. By contrast, this example deals with a case where, not only is shooting performed with a fast shutter speed, optical camera shake correction is used during shooting.

Optical camera shake correction reduces blur in the optical image falling on the sensor which results from camera shake occurring in the image-shooting apparatus 1. Specifically, there are provided a device, such as a gyro sensor, that detects camera shake in the image-shooting apparatus 1 and a device that drives the optical system such as the lens portion 3 and the image sensor 2, and the optical system is driven to cancel out the detected camera shake so that the shot image contains less blur. The configuration just mentioned is merely an example, and any other configuration may be adopted so long as it achieves optical camera shake correction.

The effect of reducing blur by optical camera shake correction, when considered in terms of the effect of selecting a faster shutter speed, corresponds to about two to three steps (two to three graduations along the horizontal axis of the program line diagram in FIG. 4); that is, it approximately corresponds to the effect of selecting a four to eight times faster shutter speed (one-fourth to one-eighth in value). Thus, by use of optical camera shake correction, it is possible to more effectively make the first input images contain high-frequency components equal to or higher than the Nyquist frequency or folding noise. It is thus possible to generate an output image sufficiently resolution-enhanced by super-resolution processing.

When optical camera shake correction is used, the super-resolution limit shutter speed T can be made slower. As described above, the effect of reducing blur by optical camera shake correction approximately corresponds to selecting a four to eight times faster shutter speed (one-fourth to one-eighth in value). Thus, even when the super-resolution limit shutter speed T is made four to eight times slower, the first input images can be obtained with as much reduced blur as when optical camera shake correction is not used.

Making the super-resolution limit shutter speed T slower in this way makes it possible to widen the range of shooting situations in which a proper effect of super-resolution processing is obtained. Specifically, it is possible to make less likely such situations in which, although the light entering the image-shooting apparatus 1 is dim, a fast shutter speed is selected forcibly to obtain the effect of super-resolution processing. In this way, it is possible to reduce the noise contained in the first input images and to maintain proper lightness.

The above effect is obtained when the super-resolution limit shutter speed T in cases where the optical camera shake correction is used is set less than the super-resolution limit shutter speed T in cases where optical camera shake correction is not used. To ensure the effect, the maximum degree to which the super-resolution limit shutter speed T is made slower may be limited to two to four times. The super-resolution limit shutter speed T may instead be set at $1/(5 \times f)$ seconds.

The super-resolution limit shutter speed T made slower as described above may be used only as a reference for deciding the shutter speed for the shooting of the first input images, and not as a reference for deciding the shutter speed for the shooting of the second input image (for the second input image, the super-resolution limit shutter speed T is not changed depending on whether optical camera shake correction is used or not. With this configuration, it is possible simply to obtain the effect of optical camera shake correction, thereby to reduce noise contained in the second input image.

Alternatively, the super-resolution limit shutter speed T made slower as described above may be used as a reference for deciding the shutter speed for the shooting of the second input image. With this configuration, it is possible, while suppressing increase of blur contained in the second input image, to further reduce noise contained in the second input image.

Detection of Blur in Shooting Target

This example deals with a configuration that can reduce blur in a shooting target (part or all of an image) which occurs in a first input image due to camera shake or subject motion.

In the configuration of this example, the magnitude of blur (hereinafter referred to as the amount of blur) in a shooting target which is expected to occur in a first input image when it is shot is calculated, and the shutter speed is set based on that amount of blur. In a case where the amount of blur is calculated through image processing as will be described below, part of the image processing portion 6 may calculate it.

Figure 18A:
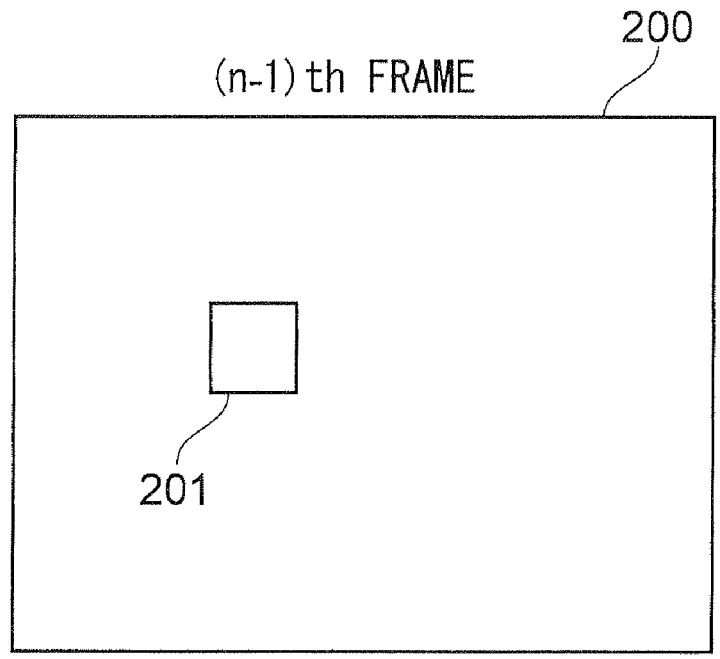
FIG. 18A is a diagram showing an example of a method for calculating the amount of blur in a shooting target.
Figure 18B:
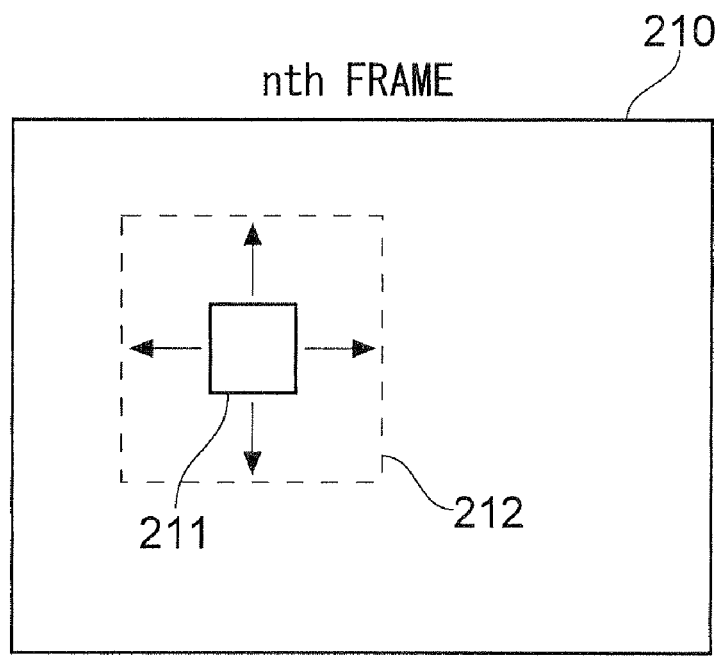
FIG. 18B is a diagram showing an example of a method for calculating the amount of blur in a shooting target.

First, as an example of a method for calculating the amount of blur in a shooting target, a case where block matching is applied will be described with reference to the relevant drawings. FIGS. 18A and 18B are diagrams showing an example of a method for calculating the amount of blur in a shooting target. In block matching, at least part of a shooting target is taken as a target block, and the target block is detected from one frame after another obtained by continuous shooting, thereby to detect (track) the shooting target.

The shooting target and the target block mentioned above may be set by the user specifying them, or may be set automatically by a program such as for face detection. The frames mentioned above may be through images shot continuously during previewing before the shooting of first and second input images.

FIG. 18A shows an (n−1)th frame 200 along with a target block 201 set within the (n−1)th frame 200. FIG. 18B shows an nth frame 210 along with a candidate block 211—a candidate that can be taken as the target block 201 within the nth frame 210—and a search block 212 in which the candidate block 211 is searched for.

The candidate block 211 is moved, one pixel at a time, in the horizontal or vertical direction within the block 212, and every time it is so moved, the correlation value between it and the target block 201 is calculated. Used as the correlation value may be, for example, the SAD (sum of absolute differences) of luminance differences at individual pixels between the target block 201 and the candidate block 211, or the SSD (sum of squared differences) of those luminance differences. The correlation value may be determined by calculating the SAD or SSD of any other signal values than illuminance differences.

The higher the correlation between the image of the target block 201 and the image of the candidate block 211, the smaller the correlation value. Accordingly, by determining the position of the candidate block 211 where the correlation value is smallest, it is possible to determine where within the nth frame the target block 201 is located, and it is also possible to calculate the amount of movement of the target block 201 (the shooting target) between frames. That is, it is possible to calculate the apparent movement speed of the shooting target (its speed of movement within an image resulting from camera shake, or subject motion, or both).

Then, by use of the movement speed, it is possible to calculate the amount of movement of the shooting target during the exposure time indicated by the shutter speed decided in STEP 3 in FIG. 3, that is, it is possible to calculate the amount of blur that is expected to occur in a first input image.

In this example, for example, between STEP 3 and STEP 4 in FIG. 3, the shutter speed decided in STEP 3 is adjusted. Here, for example, if the amount, or magnitude, of blur calculated as described above is less than a predetermined magnitude (e.g., one pixel), no adjustment may be done. On the other hand, if the amount of blur calculated is equal to or more than the predetermined magnitude (e.g., one pixel), the shutter speed decided in STEP 3 is adjusted to be faster such that the amount of blur is equal to or less than the predetermined magnitude (e.g., one pixel). Then, at STEP 4, first input images are shot at the thus adjusted shutter speed.

With this configuration, it is possible to effectively suppress blur contained in the first input images so that the first input images can contain high-frequency components equal to or higher than the Nyquist frequency or folding noise. It is thus possible to generate an output image sufficiently resolution-enhanced by super-resolution processing.

The range in which (at least the upper limit at or below which) the shutter speed can be adjusted may be prescribed. Specifically, for example, the range in which the shutter speed can be adjusted may be from one-half to one-eighth (equivalent to one to three stops) of the original shutter speed. When the shutter speed needs to be made faster beyond that range in order to make the amount of blur in the shooting target equal to or less than the predetermined magnitude, then no adjustment of the shutter speed may be done.

With this configuration, it is possible to reduce the likelihood of an unsharp first input image being shot due to the adjusted shutter speed being too fast.

Disuse of High-Resolution Image

In the embodiment described above, a configuration may be adopted in which, when the third method is selected, the output image is generated without using the high-resolution image.

For example, the averaged image or the first interpolated image (see FIG. 6) generated by the second method may be output, as it is, as the output image. No high-resolution image may be generated at all.

For another example, the second input image or the second interpolated image (see FIG. 7) generated by the third method may be output, as it is, as the output image. No high-resolution image may be generated at all, and no first input images may be shot at all.

As described above, when the third method is selected, first input images can contain much noise. Thus, by not using the high-resolution image that can contain accordingly much noise for the generation of the output image, it is possible to effectively reduce noise in the output image. Furthermore, by abolishing the generation of the high-resolution image or of the shooting of first input images, it is possible to simplify the processing.

Other Modifications

The super-resolution processing described above can be applied not only to still images but also to moving images. In an image-shooting apparatus 1 embodying the invention, the operation of the image processing portion 6 and the super-resolution processing portion 60 may be performed by a control device such as a microcomputer. All or part of the functions realized by such a control device may be prepared in the form of a program so that, by executing the program on a program execution device (e.g., computer), all or part of those functions are realized.

In the case described above, and also in any other cases, the image-shooting apparatus 1 in FIG. 1 and the super-resolution processing portion 60 in FIGS. 1 and 2 can be realized in hardware or in a combination of hardware and software. In a case where the image-shooting apparatus 1 and the super-resolution processing portion 60 are realized in software, a block diagram of a part realized in software serves as a functional block diagram of that part.

It should be understood that the embodiment by way of which the invention has been described is in no way meant to limit the scope of the invention, and that the invention can be implemented with any modifications or variations made without departing the spirit of the invention.

The present invention relates to image-shooting apparatuses exemplified by digital cameras, and relates to image-shooting apparatuses capable of executing super-resolution processing whereby a high-resolution image is obtained based on a low-resolution image obtained by shooting.

What is claimed is:

1. An image-shooting apparatus comprising:

an image-shooting portion generating an input image by shooting; and a super-resolution processing portion performing super-resolution processing on a plurality of input images obtained from the image-shooting portion to generate an output image having a resolution equal to or higher than a resolution of the input images;

wherein a shutter speed at which the image-shooting portion shoots at least one of the input images is made equal to or faster than a super-resolution limit shutter speed, which is a lower-limit shutter speed that enables the super-resolution processing to make the resolution of the output image equal to or higher than the resolution of the input images; further wherein there are a plurality of methods for the super-resolution processing performed by the super-resolution processing portion, and the super-resolution processing portion performs one of the plurality of methods selected based on an amount of exposure in the image-shooting portion, wherein the super-resolution processing portion includes;

a high-resolution image generation portion fusing the plurality of input images together to generate a high-resolution image;

an averaging processing portion that applies averaging processing to the plurality of input images to generate an averaged image; and a weighted addition processing portion performing weighted addition processing on the high-resolution image and a predetermined image to generate a weighted added image, and when the amount of exposure is less than a first threshold value, the weighted addition processing portion generates the weighted added image by performing weighted addition processing on the high-resolution image and an image based on the averaged image, and the weighted added image is taken as the output image.

2. An image-shooting apparatus comprising:

an image-shooting portion generating an input image by shooting; and a super-resolution processing portion performing super-resolution processing on a plurality of input images obtained from the image-shooting portion to generate an output image having a resolution equal to or higher than a resolution of the input images;

wherein a shutter speed at which the image-shooting portion shoots at least one of the input images is made equal to or faster than a super-resolution limit shutter speed, which is a lower-limit shutter speed that enables the super-resolution processing to make the resolution of the output image equal to or higher than the resolution of the input images; further wherein there are a plurality of methods for the super-resolution processing performed by the super-resolution processing portion, and the super-resolution processing portion performs one of the plurality of methods selected based on an amount of exposure in the image-shooting portion, wherein the super-resolution processing portion includes;
a high-resolution image generation portion fusing the plurality of input images together to generate a high-resolution image; and
a weighted addition processing portion performing weighted addition processing on the high-resolution image and a predetermined image to generate a weighted added image,
the input images comprises a first input image obtained by shooting at a shutter speed equal to or faster than the super-resolution limit shutter speed and a second input image obtained by shooting at a shutter speed slower than the super-resolution limit shutter speed, and
when the amount of exposure is less than a second threshold value, the weighted addition processing portion generates the weighted added image by performing weighted addition processing on the high-resolution image and an image based on the second input image, and
the weighted added image is taken as the output image.

3. The image-shooting apparatus according to claim 1, wherein
the input images comprises a first input image obtained by shooting at a shutter speed equal to or faster than the super-resolution limit shutter speed and a second input image obtained by shooting at a shutter speed slower than the super-resolution limit shutter speed, and
when the amount of exposure is less than a second threshold value which is less than the first threshold value,
the weighted addition processing portion generates the weighted added image by performing weighted addition processing on the high-resolution image and an image based on the second input image, and
the weighted added image is taken as the output image.

4. The image-shooting apparatus according to claim 1, wherein
when the amount of exposure is less than a second threshold value which is less than the first threshold value,
an image based on the averaged image is taken as the output image.

5. An image-shooting apparatus comprising:
an image-shooting portion generating an input image by shooting; and
a super-resolution processing portion performing super-resolution processing on a plurality of input images obtained from the image-shooting portion to generate an output image having a resolution equal to or higher than a resolution of the input images;
wherein a shutter speed at which the image-shooting portion shoots at least one of the input images is made equal to or faster than a super-resolution limit shutter speed, which is a lower-limit shutter speed that enables the super-resolution processing to make the resolution of the output image equal to or higher than the resolution of the input images; further
wherein there are a plurality of methods for the super-resolution processing performed by the super-resolution processing portion, and the super-resolution processing portion performs one of the plurality of methods selected based on an amount of exposure in the image-shooting portion,
an image display portion displaying an image,
wherein, before shooting of the input images, which of the methods for super-resolution processing is expected to be selected based on the amount of exposure is displayed and indicated on the display portion.

* * * * *